(12) United States Patent
Principe et al.

(10) Patent No.: US 10,755,698 B2
(45) Date of Patent: Aug. 25, 2020

(54) PULSE-BASED AUTOMATIC SPEECH RECOGNITION

(71) Applicant: University of Florida Research Foundation, Inc., Gainesville, FL (US)

(72) Inventors: Jose C. Principe, Gainesville, FL (US); Kan Li, Gainesville, FL (US)

(73) Assignee: UNIVERSITY OF FLORIDA RESEARCH FOUNDATION, INC., Gainesville, FL (US)

( * ) Notice: Subject to any disclaimer, the term of this patent is extended or adjusted under 35 U.S.C. 154(b) by 2 days.

(21) Appl. No.: 16/060,125

(22) PCT Filed: Dec. 7, 2016

(86) PCT No.: PCT/US2016/065344
§ 371 (c)(1),
(2) Date: Jun. 7, 2018

(87) PCT Pub. No.: WO2017/100298
PCT Pub. Date: Jun. 15, 2017

(65) Prior Publication Data
US 2018/0358002 A1  Dec. 13, 2018

Related U.S. Application Data

(60) Provisional application No. 62/263,958, filed on Dec. 7, 2015.

(51) Int. Cl.
*G10L 15/14* (2006.01)
*G10L 15/02* (2006.01)
(Continued)

(52) U.S. Cl.
CPC ............ *G10L 15/148* (2013.01); *G06N 3/049* (2013.01); *G06N 3/08* (2013.01); *G06N 7/005* (2013.01);
(Continued)

(58) Field of Classification Search
CPC ....... G10L 15/148; G10L 15/02; G10L 15/14; G10L 15/16; G06N 20/10; G06N 3/049; G06N 3/08; G06N 7/005
See application file for complete search history.

(56) References Cited

U.S. PATENT DOCUMENTS 6,336,091 B1 * 1/2002 Polikaitis ................ G10L 25/78
704/233
8,756,265 B1   6/2014 Halevy et al.
(Continued)

OTHER PUBLICATIONS

Principe et al., Kernel Methods on Spike Train Space for Neuroscience, Jul. 2013, IEEE Signal Processing Magazine, (Year: 2013).*
(Continued)

*Primary Examiner* — Sonia L Gay
(74) *Attorney, Agent, or Firm* — Thomas Horstemeyer, LLP

(57) ABSTRACT

Various examples are provided related to speech recognition. In one example, a method includes converting an auditory signal into a pulse train, segmenting the pulse train into a series of frames having a predefined duration, and identifying a portion of the auditory signal by applying at least a portion of the series of frames segmented from the pulse train to a kernel adaptive autoregressive-moving-average (KAARMA) network. In another example, a speech recognition system includes processing circuitry configured to convert an auditory signal into a pulse train, segment the pulse train into a secured of frames, and identifying a portion of the auditory signal by applying at least a portion of the series of frames segmented from the pulse train to a KAARMA network. The series of frames segmented from the pulse train can be applied to a KAARMA chain including a plurality of KAARMA networks for identification.

20 Claims, 22 Drawing Sheets

(51) Int. Cl.
  *G10L 15/16* (2006.01)
  *G06N 20/10* (2019.01)
  *G06N 3/04* (2006.01)
  *G06N 3/08* (2006.01)
  *G06N 7/00* (2006.01)

(52) U.S. Cl.
  CPC .............. *G06N 20/10* (2019.01); *G10L 15/02* (2013.01); *G10L 15/14* (2013.01); *G10L 15/16* (2013.01)

(56) References Cited

U.S. PATENT DOCUMENTS

| | | | |
|---|---|---|---|
| 2008/0101705 A1* | 5/2008 | Mohamed | G06K 9/00885 382/224 |
| 2011/0004475 A1* | 1/2011 | Bellegarda | G10L 15/08 704/251 |
| 2015/0220832 A1 | 8/2015 | Lazar et al. | |
| 2016/0235987 A1* | 8/2016 | Isik | A61N 1/36038 |

OTHER PUBLICATIONS

Tuia et al., "Explicit Recursive and Adaptive Filtering in Reproducing Kernel Hilbert Spaces", 2014, IEEE Transactions on Neural Networks and Learning Systems (Year: 2014).*

Li, et al., "The Kernel Adaptive Autoregressive-Moving-Average Algorithm"; IEEE TNNLS Special Issue on Eurodynamic Systems for Optimization and Applications, Jan. 1, 2015.

International Search Report in co-pending, related PCT Application No. PCT/US2016/065344, dated Feb. 16, 2017.

Y. Zhang, P. Li, Y. Jin, and Y. Choe, "A digital liquid state machine with biologically inspired learning and its application to speech recognition," IEEE Trans. Neural Netw. Learn. Syst., vol. 26, No. 11, pp. 2635-2649, Nov. 2015.

B. Schrauwen, M. D'Haene, D. Verstraeten, and J. Van Campenhout, "Compact hardware liquid state machines on FPGA for real-time speech recognition," Neural Netw., vol. 21, No. 2, pp. 511-523, Mar. 2008.

D. Verstraeten, B. Schrauwen, D. Stroobandt, and J. Van Campenhout, "Isolated word recognition with the Liquid State Machine: A case study," Inf. Process. Lett., vol. 95, No. 6, pp. 521-528, Sep. 2005.

W. Walker et al., "Sphinx-4: A flexible open source framework for speech recognition," Sun Microsystems Inc., Mountain View, CA, USA, Tech. Rep. SMLI TR-2004-139, Nov. 2004.

A. Graves, D. Eck, N. Beringer, and J. Schmidhuber, "Biologically plausible speech recognition with LSTM neural nets," in Biologically Inspired Approaches to Advanced Information Technology, A. Ijspeert, M. Murata, and N. Wakamiya, Eds. Berlin, Germany: Springer-Verlag, Jan. 2004.

* cited by examiner

Algorithm 1: Kernel Adaptive ARMA Algorithm

Initialization:
$n_u$: input dimension
$n_s$: state dimension
$n_y$: output dimension
$a_s$: state kernel parameter
$a_u$: input kernel parameter
$\eta$: learning rate
Randomly initialize input $u_0 \in \mathbb{R}^{1 \times n_u}$
Randomly initialize states $s_{-1}$ and $s_0 \in \mathbb{R}^{1 \times n_s}$
Randomly initialize coefficient matrix $A \in \mathbb{R}^{1 \times n_s}$
$\Psi = [\psi(s_{-1}, u_0)]$: feature matrix
$S = [s_{-1}]$: state dictionary
$m = 1$: dictionary size
$I = \begin{bmatrix} 0 & I_{n_y} \end{bmatrix} \in \mathbb{R}^{n_y \times n_s}$: measurement matrix

Computation:
for time $t = 1, \cdots, n$ do
    Initialization
    $\Psi' = [\,]$: feature matrix update
    $S' = [\,]$: state matrix update
    $V_t^{(k)} = I_{n_s}^{(k)} \in \mathbb{R}^{n_s \times 1}$, for $k = 1, \cdots, n_s$.
    Update State-Transition Gradient Matrix
    for time $i = 1, \cdots, t$ do
        Generate Next State (14)
        $s_i = \Omega^T \psi(s_{i-1}, u_i)$
        Update State Gradient (25)
        $D_i = \left[(S^{(1)} - s_{i-1}), \cdots, (S^{(m)} - s_{i-1})\right]$
        $K_i = \text{diag}(\Psi^T \psi(s_{i-1}, u_i))$
        $A_i = 2a_s A^T K_i D_i^T$
        $V_i^{(k)} = \left[A_i V_{i-1}^{(k)}, I_{n_s}^{(k)}\right]$
        Update Feature and State Matrices
        $\Psi' = [\Psi', \psi(s_{i-1}, u_i)]$
        $S' = [S', s_{i-1}]$
    Prediction
    $y_t = I s_t$
    Update Weights in the RKHS (28)
    $e_t = d_t - y_t$
    $A^{(k)} = \begin{bmatrix} A_t^{(k)} \\ \eta \left(I V_t^{(k)}\right)^T e_t \end{bmatrix}$
    $\Psi = [\Psi, \Psi']$
    $S = [S, S']$
    $\Omega = \Psi A$
    $m = m + t$

FIG. 3A

Algorithm 2: Quantization Algorithm

Initialization:
$q$: quantization threshold
$a_s$: state kernel parameter
$a_u$: input kernel parameter
$\Psi$: feature matrix
$A$: coefficient matrix
$\Psi'$: feature matrix update
$A'$: coefficient update
$m$: dictionary size
$m'$: new centers size Computation:
for $i = 1, \cdots, m'_a$ do
$\quad dis(\Psi'^{(i)}, \Psi) \triangleq$
$\quad\quad \min_{1 \leq j \leq m} a_s \|s'_i - s_j\| + a_u \|u'_i - u_j\|$
$\quad j^* \triangleq \arg\min_{1 \leq j \leq m} a_s \|s'_i - s_j\| + a_u \|u'_i - u_j\|$
$\quad$ if $dis(\Psi'^{(i)}, \Psi) < q$ then
$\quad\quad A(j^*) = A(j^*) + A'(i)$
$\quad$ else
$\quad\quad \Psi = [\Psi, \psi(s'_i, u'_i)]$
$\quad\quad A = \begin{bmatrix} A \\ A'(i) \end{bmatrix}$
$\quad\quad m = m + 1$

FIG. 3B

TABLE I
CONFUSION MATRICES FOR KAARMA CLASSIFIERS USING HIDDEN STATES OF DIMENSION 3.

| | Predicted Actual | Digit 0 | 1 | 2 | 3 | 4 | 5 | 6 | 7 | 8 | 9 |
|---|---|---|---|---|---|---|---|---|---|---|---|
| Train | Digit 0 | 267 | 0 | 2 | 0 | 0 | 0 | 1 | 0 | 0 | 0 |
| | Digit 1 | 0 | 264 | 0 | 0 | 0 | 0 | 2 | 2 | 0 | 2 |
| | Digit 2 | 2 | 0 | 263 | 0 | 0 | 0 | 0 | 4 | 0 | 1 |
| | Digit 3 | 0 | 0 | 0 | 263 | 0 | 1 | 0 | 1 | 0 | 0 |
| | Digit 4 | 0 | 1 | 0 | 0 | 269 | 0 | 0 | 0 | 0 | 0 |
| | Digit 5 | 0 | 2 | 0 | 0 | 0 | 260 | 0 | 1 | 0 | 7 |
| | Digit 6 | 1 | 1 | 0 | 1 | 1 | 0 | 250 | 4 | 9 | 3 |
| | Digit 7 | 1 | 2 | 2 | 3 | 1 | 2 | 0 | 253 | 4 | 2 |
| | Digit 8 | 1 | 0 | 0 | 0 | 0 | 0 | 7 | 1 | 259 | 2 |
| | Digit 9 | 0 | 2 | 3 | 6 | 0 | 4 | 0 | 8 | 0 | 247 |

Recognition Success: 96.11%

| | | Digit 0 | 1 | 2 | 3 | 4 | 5 | 6 | 7 | 8 | 9 |
|---|---|---|---|---|---|---|---|---|---|---|---|
| Test | Digit 0 | 126 | 0 | 2 | 0 | 1 | 1 | 0 | 0 | 0 | 0 |
| | Digit 1 | 0 | 122 | 0 | 0 | 1 | 1 | 3 | 2 | 0 | 1 |
| | Digit 2 | 3 | 0 | 116 | 0 | 4 | 2 | 1 | 4 | 0 | 0 |
| | Digit 3 | 0 | 0 | 0 | 119 | 0 | 1 | 1 | 1 | 3 | 5 |
| | Digit 4 | 0 | 1 | 2 | 0 | 125 | 0 | 1 | 0 | 1 | 0 |
| | Digit 5 | 0 | 4 | 0 | 0 | 0 | 115 | 1 | 2 | 3 | 5 |
| | Digit 6 | 1 | 2 | 0 | 0 | 3 | 2 | 100 | 5 | 11 | 6 |
| | Digit 7 | 0 | 1 | 4 | 2 | 1 | 2 | 2 | 107 | 9 | 2 |
| | Digit 8 | 0 | 0 | 0 | 1 | 0 | 0 | 10 | 2 | 116 | 1 |
| | Digit 9 | 0 | 1 | 2 | 1 | 0 | 17 | 4 | 10 | 0 | 95 |

Recognition Success: 87.77%

FIG. 4A

TABLE II
EACH OF THE DIGITS FROM "ZERO" THROUGH "NINE" IS EXPRESSED AS PHONEME SEQUENCES

| ONE: | W | AX | N | |
|---|---|---|---|---|
| TWO: | T | UW | | |
| THREE: | TH | R | IY | |
| FOUR: | F | OW | R | |
| FIVE: | F | AY | V | |
| SIX: | S | IH | K | S |
| SEVEN: | S | EH | V | EH N |
| EIGHT: | EY | T | | |
| NINE: | N | AY | N | |
| ZERO: | Z | IY | R | OW |

FIG. 4B

TABLE III
TESTING CONFUSION MATRIX FOR KAARMA CLASSIFIERS BY SEQUENCE ORDERING.

| Digit | Left-to-Right | | | Right-to-Left | | |
|---|---|---|---|---|---|---|
| | TP | FP | Accuracy | TP | FP | Accuracy |
| 0 | 96.92% | 0.43% | 99.31% | 94.62% | 0.43% | 99.08% |
| 1 | 90.77% | 0.94% | 98.23% | 88.46% | 0.77% | 98.15% |
| 2 | 84.62% | 0.51% | 98.00% | 63.08% | 1.11% | 95.31% |
| 3 | 89.23% | 0.34% | 98.62% | 92.31% | 0.51% | 98.77% |
| 4 | 94.62% | 0.51% | 99.00% | 84.62% | 0.94% | 97.62% |
| 5 | 88.46% | 1.54% | 97.46% | 70.00% | 0.60% | 96.46% |
| 6 | 70.00% | 1.37% | 95.77% | 70.77% | 1.62% | 95.62% |
| 7 | 76.15% | 1.71% | 96.08% | 81.53% | 1.97% | 96.38% |
| 8 | 79.23% | 1.62% | 96.46% | 87.69% | 0.26% | 98.54% |
| 9 | 65.38% | 1.20% | 95.46% | 76.92% | 0.94% | 96.85% |

FIG. 4C

TABLE VI
PERFORMANCES OF KAARMA CLASSIFIERS USING DIFFERENT ORDERING SCHEMES.

| | Left-to-Right | Right-to-Left | Selective | Both |
|---|---|---|---|---|
| Train | 96.11% | 96.30% | 97.77% | 99.48% |
| Test | 87.77% | 86.46% | 91.15% | 95.00% |

FIG. 4D

TABLE XIV
CONFUSION MATRICES FOR A 5-STATE KAARMA CHAIN USING FIRING RATES.

|  | Predicted Actual | Digit 0 | 1 | 2 | 3 | 4 | 5 | 6 | 7 | 8 | 9 |
|---|---|---|---|---|---|---|---|---|---|---|---|
| Train | Digit 0 | 269 | 0 | 0 | 0 | 0 | 0 | 0 | 1 | 0 | 0 |
|  | Digit 1 | 0 | 268 | 0 | 0 | 0 | 0 | 1 | 0 | 1 | 0 |
|  | Digit 2 | 0 | 0 | 269 | 0 | 0 | 0 | 0 | 1 | 0 | 0 |
|  | Digit 3 | 0 | 0 | 0 | 269 | 0 | 0 | 0 | 1 | 0 | 0 |
|  | Digit 4 | 1 | 0 | 0 | 0 | 268 | 0 | 1 | 0 | 0 | 0 |
|  | Digit 5 | 0 | 0 | 1 | 0 | 0 | 269 | 0 | 0 | 0 | 0 |
|  | Digit 6 | 0 | 0 | 0 | 0 | 0 | 0 | 270 | 0 | 0 | 0 |
|  | Digit 7 | 0 | 0 | 10 | 0 | 0 | 0 | 7 | 262 | 0 | 0 |
|  | Digit 8 | 0 | 0 | 0 | 1 | 0 | 0 | 3 | 0 | 266 | 0 |
|  | Digit 9 | 0 | 2 | 0 | 2 | 0 | 2 | 0 | 0 | 0 | 264 |
|  | Recognition Success: 99.04% | | | | | | | | | | |
| Test | Digit 0 | 126 | 0 | 1 | 0 | 1 | 1 | 0 | 1 | 0 | 0 |
|  | Digit 1 | 0 | 127 | 1 | 0 | 0 | 1 | 0 | 0 | 0 | 1 |
|  | Digit 2 | 0 | 1 | 113 | 0 | 0 | 4 | 4 | 8 | 0 | 0 |
|  | Digit 3 | 0 | 0 | 0 | 128 | 0 | 0 | 0 | 1 | 1 | 0 |
|  | Digit 4 | 0 | 0 | 0 | 0 | 127 | 1 | 0 | 2 | 0 | 0 |
|  | Digit 5 | 0 | 1 | 3 | 0 | 0 | 120 | 1 | 0 | 2 | 3 |
|  | Digit 6 | 0 | 0 | 4 | 0 | 1 | 1 | 116 | 1 | 2 | 5 |
|  | Digit 7 | 0 | 3 | 3 | 0 | 0 | 1 | 10 | 111 | 0 | 2 |
|  | Digit 8 | 0 | 0 | 1 | 1 | 0 | 0 | 4 | 1 | 120 | 3 |
|  | Digit 9 | 1 | 4 | 2 | 2 | 0 | 13 | 1 | 0 | 1 | 106 |
|  | Recognition Success: 91.85% | | | | | | | | | | |

FIG. 8A

TABLE XV
CONFUSION MATRICES FOR A 5-STATE KAARMA CHAIN USING SPIKE TRAINS.

|  | Predicted Actual | Digit 0 | 1 | 2 | 3 | 4 | 5 | 6 | 7 | 8 | 9 |
|---|---|---|---|---|---|---|---|---|---|---|---|
| Train | Digit 0 | 263 | 1 | 5 | 0 | 0 | 0 | 0 | 1 | 0 | 0 |
|  | Digit 1 | 0 | 265 | 1 | 0 | 2 | 0 | 0 | 0 | 0 | 2 |
|  | Digit 2 | 4 | 0 | 265 | 0 | 0 | 0 | 1 | 0 | 0 | 0 |
|  | Digit 3 | 0 | 0 | 24 | 245 | 0 | 0 | 1 | 0 | 0 | 0 |
|  | Digit 4 | 0 | 0 | 1 | 0 | 269 | 0 | 0 | 0 | 0 | 0 |
|  | Digit 5 | 1 | 0 | 1 | 0 | 0 | 266 | 0 | 1 | 0 | 1 |
|  | Digit 6 | 0 | 0 | 5 | 0 | 0 | 0 | 257 | 3 | 5 | 0 |
|  | Digit 7 | 0 | 0 | 10 | 0 | 0 | 0 | 3 | 267 | 0 | 0 |
|  | Digit 8 | 0 | 1 | 0 | 2 | 0 | 0 | 0 | 3 | 264 | 0 |
|  | Digit 9 | 0 | 5 | 7 | 0 | 0 | 7 | 0 | 1 | 0 | 250 |
|  | Recognition Success: 96.70% | | | | | | | | | | |
| Test | Digit 0 | 127 | 0 | 1 | 0 | 0 | 0 | 0 | 2 | 0 | 0 |
|  | Digit 1 | 0 | 123 | 0 | 0 | 1 | 2 | 1 | 2 | 0 | 1 |
|  | Digit 2 | 2 | 0 | 125 | 1 | 0 | 0 | 0 | 2 | 0 | 0 |
|  | Digit 3 | 0 | 0 | 7 | 122 | 0 | 0 | 0 | 0 | 1 | 0 |
|  | Digit 4 | 0 | 5 | 0 | 0 | 124 | 0 | 0 | 2 | 0 | 0 |
|  | Digit 5 | 0 | 1 | 0 | 0 | 0 | 120 | 0 | 1 | 0 | 8 |
|  | Digit 6 | 0 | 0 | 1 | 0 | 0 | 0 | 106 | 11 | 12 | 0 |
|  | Digit 7 | 0 | 0 | 0 | 0 | 0 | 1 | 0 | 128 | 0 | 1 |
|  | Digit 8 | 0 | 0 | 4 | 4 | 0 | 0 | 0 | 6 | 116 | 0 |
|  | Digit 9 | 0 | 0 | 1 | 1 | 0 | 1 | 0 | 1 | 1 | 125 |
|  | Recognition Success: 93.54% | | | | | | | | | | |

FIG. 8B

TABLE XVI
SUMMARY OF SPIKE-BASED INPUT KAARMA CHAIN CLASSIFICATION RESULTS.

| | 5-State HMM (8 Gaussians) | Training | Testing |
|---|---|---|---|
| Rates | | 93.74% | 93.23 % |
| | 5-State L-to-R KAARMA Chain | Training | Testing |
| Rates | Left-to-Rigth | 99.04% | 91.85 % |
| | Bi-Directional | 99.56% | 94.54 % |
| Spike Trains | Left-to-Rigth | 96.70% | 93.54 % |
| | Bi-Directional | 98.56% | 95.23 % |

FIG. 8C

TABLE XVII
PERFORMANCES OF LSM-BASED CLASSIFIERS

|  | Criteria | Linear Classification | p-Delta Rule | Linear Regression | Backpropagation |
|---|---|---|---|---|---|
| Train | CC | 0.4568 | 0.6109 | 0.4773 | 0.7280 |
|  | MAE | 0.2721 | 0.2533 | 0.4006 | 0.2327 |
|  | MSE | 0.2721 | 0.1662 | 0.1928 | 0.1175 |
|  | score | 0.7841 | 0.5773 | 0 | 0 |
| Test | CC | 0.4527 | 0.5652 | 0.3757 | 0.6772 |
|  | MAE | 0.2710 | 0.2674 | 0.4086 | 0.2561 |
|  | MSE | 0.2710 | 0.1846 | 0.2207 | 0.1353 |
|  | score | 0.8052 | 0.6199 | 0 | 0 |

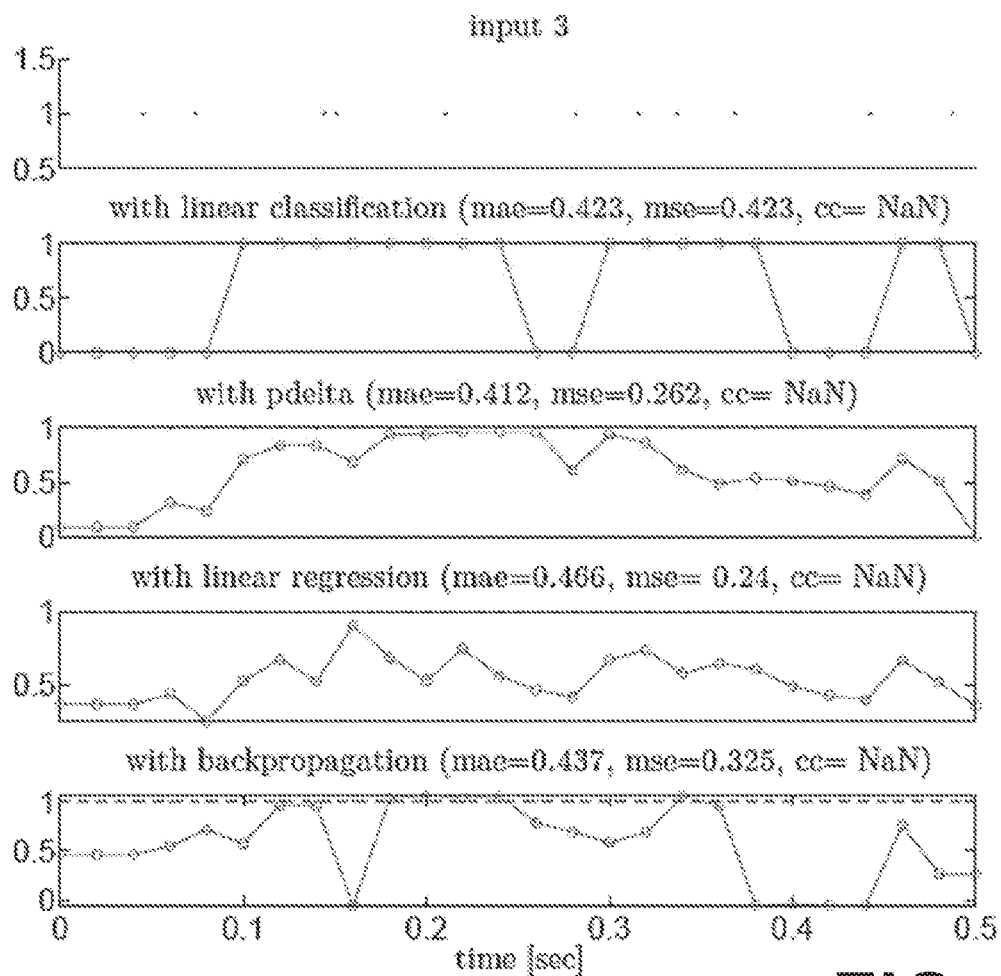
FIG. 11
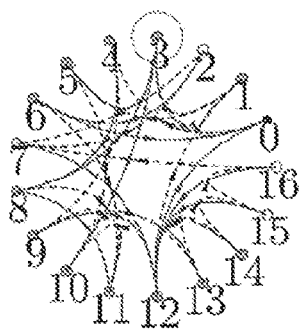 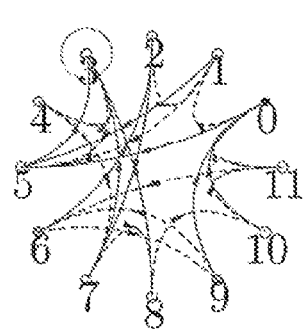
FIG. 13

PULSE-BASED AUTOMATIC SPEECH RECOGNITION

CROSS-REFERENCE TO RELATED APPLICATION

This application is the 35 U.S.C. § 371 national stage application of PCT Application No. PCT/US2016/065344, filed Dec. 7, 2016, the entirety of which is hereby incorporated by reference and which also claims priority to, and the benefit of, U.S. Provisional Application having Ser. No. 61/263,958, filed Dec. 7, 2015, the entirety of which is hereby incorporated by reference.

STATEMENT REGARDING FEDERALLY SPONSORED RESEARCH OR DEVELOPMENT

This invention was made with government support under agreement N66001-10-C-2008 awarded by the U.S. Department of Defense. The Government has certain rights in the invention.

BACKGROUND

An automatic speech recognition (ASR) system translates recorded audio signal to text. It is a pattern classification problem at its core. However, both the nonstationarity of the signal and the large variation in the temporal dimension of the speech feature sequences prevent classical classifiers such as Bayes, nearest-neighbor, or state-of-the-art classifiers such as support vector machines (SVMs), which are limited to static patterns or fixed-dimension inputs, from being implemented in a straightforward manner.

SUMMARY

Embodiments of the present disclosure are related to speech recognition.

In one embodiment, among others, a speech recognition method comprising: converting an auditory signal into a pulse train; segmenting the pulse train into a series of frames having a predefined duration; and identifying a portion of the auditory signal by applying at least a portion of the series of frames segmented from the pulse train to a kernel adaptive autoregressive-moving-average (KAARMA) network. In one or more aspects of these embodiments, the pulse train can be transformed into a reproducing kernel Hilbert space (RKHS) using a spike kernel. The KAARMA network can generate a state that identifies the portion of the auditory signal. The portion of the auditory signal can be a phoneme, a triphone, or a word.

In one or more aspects of these embodiments, the speech recognition method can comprise identifying a word by applying the series of frames segmented from the pulse train to a KAARMA chain including the KAARMA network. The word can be identified based at least in part upon a plurality of states generated by KAARMA networks of the KAARMA chain. The portion of the series of frames can be applied to the KAARMA network in a natural left-to-right temporal sequence. The portion of the series of frames can be applied to the KAARMA network in a reversed right-to-left temporal sequence.

In one or more aspects of these embodiments, the portion of the auditory signal can be identified by applying the portion of the series of frames to the KAARMA network in a natural left-to-right temporal sequence and applying the portion of the series of frames to a second KAARMA network in a reversed right-to-left temporal sequence. The portion of the auditory signal can be identified based upon a first state generated by the KAARMA network and a second state generated by the second KAARMA network. The auditory signal can be converted into a plurality of pulse trains associated with corresponding frequency bands of the auditory signal. Individual pulse trains of the plurality of pulse trains can be segmented into a corresponding series of frames having the predefined duration. The portion of the auditory signal can be identified by applying corresponding portions of the corresponding series of frames associated with the corresponding frequency bands to the KAARMA network.

In another embodiment, a speech recognition system comprises processing circuitry including a processor and memory comprising a speech recognition application, where execution of the speech recognition application by the processor causes the processing circuitry to: convert an auditory signal into a pulse train; segment the pulse train into a series of frames having a predefined duration; and identify a portion of the auditory signal by applying at least a portion of the series of frames segmented from the pulse train to a kernel adaptive autoregressive-moving-average (KAARMA) network. In one or more aspects of these embodiments, the KAARMA network can generate a state that identifies the portion of the auditory signal In one or more aspects of these embodiments, execution of the speech recognition application can cause the processing circuitry to identify a word by applying the series of frames segmented from the pulse train to a KAARMA chain including the KAARMA network. The word can be identified based at least in part upon a plurality of states generated by KAARMA networks of the KAARMA chain. The portion of the auditory signal can be identified by applying the portion of the series of frames to the KAARMA network in a natural left-to-right temporal sequence and applying the portion of the series of frames to a second KAARMA network in a reversed right-to-left temporal sequence. The portion of the auditory signal can be identified based upon a first state generated by the KAARMA network and a second state generated by the second KAARMA network.

In one or more aspects of these embodiments, the auditory signal can be converted into a plurality of pulse trains associated with corresponding frequency bands of the auditory signal, individual pulse trains of the plurality of pulse trains segmented into a corresponding series of frames having the predefined duration. The portion of the auditory signal can be identified by applying corresponding portions of the corresponding series of frames associated with the corresponding frequency bands to the KAARMA network.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A and 3B are examples of algorithms that implement portions of the KAARMA network of FIG. 2 in accordance with various embodiments of the present disclosure.

FIGS. 4A through 4D include tables illustrating performance results of the KAARMA network of FIG. 2 in accordance with various embodiments of the present disclosure.

FIGS. 8A through 8C include tables illustrating and comparing performance results of the KAARMA chain and a hidden Markov model (HMM) framework in accordance with various embodiments of the present disclosure.

FIG. 11 illustrates a misclassified spike train by the LSM of FIG. 16 in accordance with various embodiments of the present disclosure.

FIG. 13 illustrates an example of a minimized finite state machine in accordance with various embodiments of the present disclosure.

DETAILED DESCRIPTION

Figure 1:
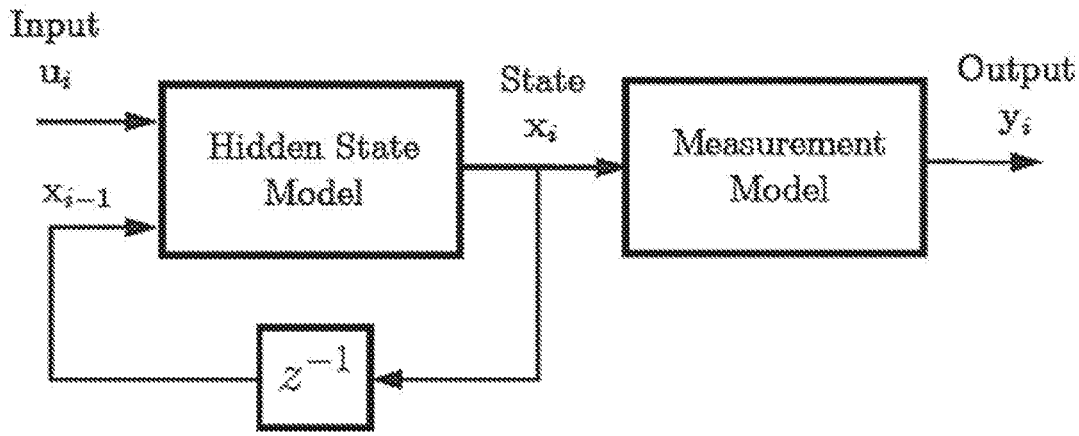
FIG. 1 is a schematic diagram of an example of a general state-space model for a dynamical system in accordance with various embodiments of the present disclosure.

Disclosed herein are various embodiments related to speech recognition. Reference will now be made in detail to the description of the embodiments as illustrated in the drawings, wherein like reference numbers indicate like parts throughout the several views.

A kernel adaptive autoregressive-moving-average (KAARMA) algorithm has the ability to model dynamical systems and as a temporal classifier using the benchmark Tomita grammars. This disclosure describes the use of KAARMA networks as an acoustic model for speech recognition. Since speech production is both nonlinear and nonstationary in nature, KAARMA-based solutions can deliver computationally efficient solutions. The performance of these grammar classifiers is shown for the fundamental application in speech processing, isolated word recognition, using both conventional feature sequences (e.g., mel-frequency cepstral coefficients or MFCCs) and biologically inspired signals (e.g., spike or pulse trains). The performance of these classifiers can be enhanced under a statistical framework.

KAARMA

The KAARMA algorithm will now be briefly described. Refer to "The kernel adaptive autoregressive-moving-average algorithm" by K. Li and J. C. Principe (*IEEE Trans. on Neural Networks and Learning Systems*, April 2015), which is hereby incorporated by reference in its entirety, for a more in depth discussion. Referring to FIG. 1, shown is an example of a general state-space model for a dynamical system. Let the dynamical system be defined in terms of a general continuous nonlinear state transition and observation functions, $f(\bullet,\bullet)$ and $h(\bullet)$, respectively, as:

$$x_i = f(x_{i-1}, u_i) \tag{1}$$

$$y_i = h(x_i), \tag{2}$$

where $$f(x_{i-1}, u_i) \triangleq [f^{(1)}(x_{i-1}, u_i), \ldots, f^{(n_x)}(x_{i-1}, u_i)]^T \tag{3}$$

$$= [x_i^{(1)}, \ldots, x_i^{(n_x)}]^T,$$

$$h(x_i) \triangleq [h^{(1)}(x_i), \ldots, h^{(n_y)}(x_i)]^T \tag{4}$$

$$= [y_i^{(1)}, \ldots, y_i^{(n_y)}]^T,$$

with input $u_i \in \mathbb{R}^{n_u}$, state $x_i \in \mathbb{R}^{n_x}$, output $y_i \in \mathbb{R}^{n_y}$, and the parenthesized superscript $^{(k)}$ indicating the k-th component of a vector or the k-th column of a matrix. Note that the input, state, and output vectors have independent degrees of freedom or dimensionality.

For simplicity, EQNS. (1) and (2) can be rewritten in terms of a new hidden state vector as:

$$s_i \triangleq \begin{bmatrix} x_i \\ y_i \end{bmatrix} = \begin{bmatrix} f(x_{i-1}, u_i) \\ h \cdot f(x_{i-1}, u_i) \end{bmatrix}, \tag{5}$$

$$y_i = s_i^{(n_s - n_y + 1: \, n_s)} = [0 \; I_{n_y}] \begin{bmatrix} x_i \\ y_i \end{bmatrix}, \tag{6}$$

where $I_{n_y}$ is an $n_y \times n_y$ identity matrix, 0 is an $n_y \times n_x$ zero matrix, and $\circ$ is the function composition operator. This augmented state vector $s_i \in \mathbb{R}^{n_s}$ is formed by concatenating the output $y_i$ with the original state vector $x_i$. With this rewriting, the measurement equation simplifies to a fixed selector matrix $\mathbb{I} \triangleq [0 \; I_{n_y}]$.

Next, define an equivalent transition function as $g(s_{i-1}, u_i) = f(x_{i-1}, u_i)$ taking as argument a new state variable s. Using this notation, EQNS. (1) and (2) become:

$$x_i = g(s_{i-1}, u_i), \tag{7}$$

$$y_i = h(x_i) = h \circ g(s_{i-1}, u_i). \tag{8}$$

To learn the general continuous nonlinear transition and observation functions, g(•,•) and h∘g(•,•), respectively, the theory of reproducing kernel Hilbert space (RKHS) can be applied. First, map the augmented state vector $s_i$ and the input vector $u_i$ into two separate RKHSs as $\varphi(s_i) \in \mathcal{H}_s$ and $\phi(u_i) \in \mathcal{H}_u$, respectively, using a spike kernel (e.g., a Schoenberg kernel). By the representer theorem, the state-space model defined by EQNS. (7) and (8) can be expressed as the following set of weights (functions in the input space) in the joint RKHS $\mathcal{H}_{su} \triangleq \mathcal{H}_s \otimes \mathcal{H}_u$ as:

$$\Omega \triangleq \Omega_{\mathcal{H}_{su}} \triangleq \begin{bmatrix} g(\cdot, \cdot) \\ h \cdot g(\cdot, \cdot) \end{bmatrix}. \tag{9}$$

where $\otimes$ is the tensor-product operator. Define the new features in the tensor-product RKHS as:

$$\psi(s_{i-1}, u_i) \triangleq \varphi(s_{i-1}) \otimes \phi(u_i) \in \mathcal{H}_{su}. \tag{10}$$

It follows that the tensor-product kernel is defined by:

$$\langle \psi(s, u), \psi(s', u') \rangle_{\mathcal{H}_{su}} = \mathcal{K}_{su}(s, u, s', u') \tag{11}$$
$$= (\mathcal{K}_s \otimes \mathcal{K}_u)(s, u, s', u')$$
$$= \mathcal{K}_s(s, s') \cdot \mathcal{K}_u(u, u').$$

This construction has several advantages over the simple concatenation of the input u and the state s. First, the tensor product kernel of two positive definite kernels is also a positive definite kernel. Second, since the adaptive filtering is performed in an RKHS using features, there is no constraint on the original input signals or the number of signals, as long as the appropriate reproducing kernel is used for each signal. Last but not least, this formulation imposes no restriction on the relationship between the signals in the original input space. This is important for input signals having different representations and spatio-temporal scales. For example, under this framework, a neurobiological system can be modeled taking spike trains, continuous amplitude local field potentials (LFPs), and vectorized state variables as inputs.

Finally, the kernel state-space model becomes:

$$s_i = \Omega^T \psi(s_{i-1}, u_i), \tag{12}$$

$$y_i = \mathbb{I} s_i. \tag{13}$$

Figure 2:
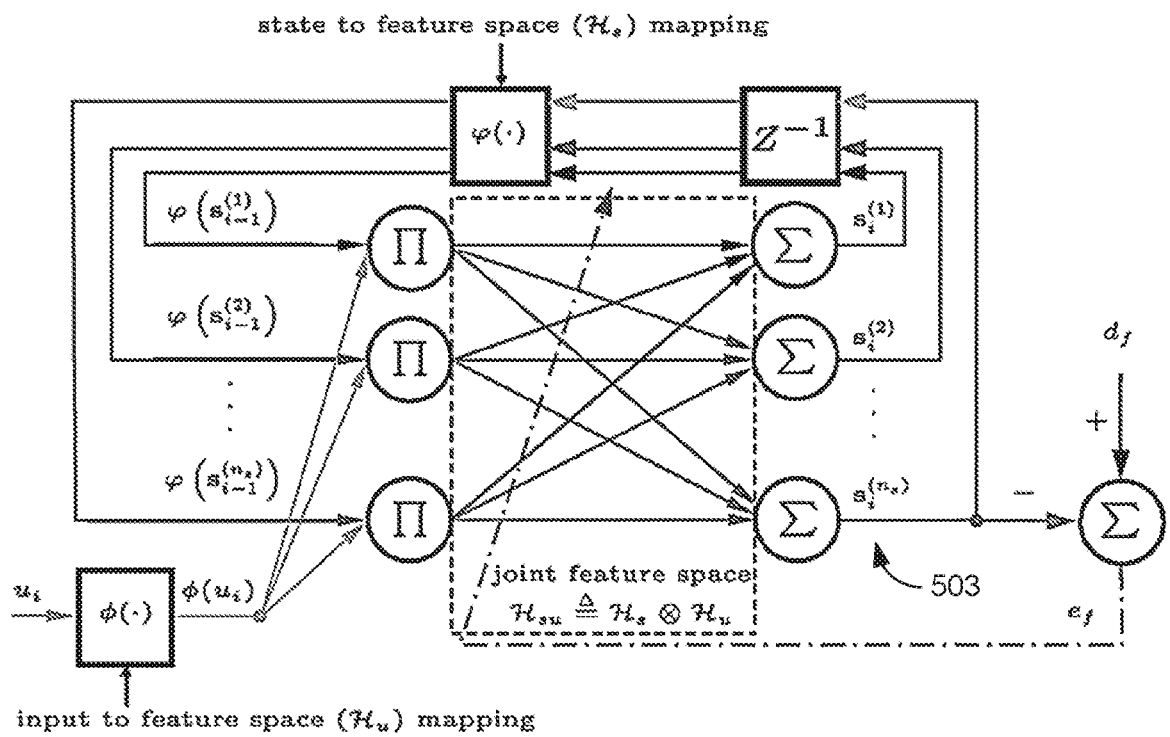
FIG. 2 illustrates an example of a kernel adaptive autoregressive-moving-average (KAARMA) network in accordance with various embodiments of the present disclosure.

FIG. 2 shows an example of a simple KAARMA network. In general, the states ($s_i$) 503 are assumed hidden, and the desired state ($s_i^{(n_s)}$) does not need to be available at every time step, e.g., a deferred desired output value for $y_i$ may only be observed at the final indexed step i=f, i.e., $d_f$.

Kernel Adaptive Recurrent Filtering. The learning procedure presented here computes the exact error gradient in the RKHS. For simplicity, consider only the Gaussian kernel in the derivation. For the state and input vectors, the joint inner products can be computed using $\mathcal{K}_{a_s}(s, s')$ and $\mathcal{K}_{a_u}(u, u')$, respectively.

The cost function at time i can be defined as:

$$\varepsilon_i = \frac{1}{2} e_i^T e_i, \tag{14}$$

where $e_i = d_i - y_i \in \mathbb{R}^{n_y \times 1}$ is the error vector, with $d_i$ as the desired signal. The error gradient with respect to the RKHS weights $\Omega_i$ at time i is:

$$\frac{\partial \varepsilon_i}{\partial \Omega_i} = \frac{\partial e_i^T e_i}{2 \partial \Omega_i} = -e_i^T \frac{\partial y_i}{\partial \Omega_i}, \tag{15}$$

where the partial derivative $$\frac{\partial y_i}{\partial \Omega_i}$$

consists of $n_s$ terms, $$\frac{\partial y_i}{\partial \Omega_i^{(1)}}, \frac{\partial y_i}{\partial \Omega_i^{(2)}}, \ldots, \frac{\partial y_i}{\partial \Omega_i^{(n_s)}},$$

corresponding to the state dimension. Note that the feature-space weights $\Omega_i$, are functions with potentially infinite dimension. Fortunately, the functional derivative is well-posed in the RKHS, since Hilbert spaces are complete normed vector spaces, the Fréchet derivative can be used to compute EQN. (15).

For the k-th component of $\Omega_i$, the gradient can be expanded using the chain rule as:

$$\frac{\partial \varepsilon_i}{\partial \Omega_i^{(k)}} = -e_i^T \frac{\partial y_i}{\partial \Omega_i^{(k)}} = -e_i^T \frac{\partial y_i}{\partial s_i} \frac{\partial s_i}{\partial \Omega_i^{(k)}}, \tag{16}$$

where $\frac{\partial y_i}{\partial \Omega_i} = \mathbb{I}$.

Applying the product rule to the gradient yields:

$$\frac{\partial s_i}{\partial \Omega_i^{(k)}} = \frac{\partial \Omega_i^T \psi(s_{i-1}, u_i)}{\partial \Omega_i^{(k)}} \tag{17}$$
$$= \Omega_i^T \frac{\partial \psi(s_{i-1}, u_i)}{\partial \Omega_i^{(k)}} + I_{n_s}^{(k)} \psi(s_{i-1}, u_i)^T,$$

where $I_{n_s}^{(k)} \in \mathbb{R}^{n_s}$ is the k-th column of the $n_s \times n_s$ identity matrix. The distinction between a recurrent formulation and the normal feed-forward kernel adaptive filtering (KAF) lies in the gradient term on the right-hand side of EQN. (17). In a recurrent network, past states are coupled with the current state input through feedback. Consequently, the partial derivatives of the previous states with respect to the current filter weights are nonzero.

Using the representer theorem, weights $\Omega_i$ at time i can be written as a linear combination of prior features given by:

$$\Omega_i = \Psi_i A_i, \tag{18}$$

where $\Psi_i \triangleq [\psi(s_{-1}, u_0), \ldots, \psi(s_{m-2}, u_{m-1})] \in \mathbb{R}^{n_\psi \times m}$ is a collection of the m past tensor-product features with potentially infinite dimension $n_\psi$, and $A_i \triangleq [\alpha_{i,1}, \ldots, \alpha_{i,n_s}] \in \mathbb{R}^{m \times n_s}$ is the set of corresponding coefficients. For feed-forward KAF such as the kernel least mean squares (KLMS) algorithm, the number of basis functions grows linearly with each new sample (m=i). Here, use m to denote a dictionary $\Psi_i$ of arbitrary size, with $\psi(s_{-1}, u_0)$ initialization. Thus, the k-th component ($1 \le k \le n_s$) of the filter weights at time i becomes:

$$\Omega_{n_s}^{(k)} = \Psi_i A_i^{(k)} = \Psi_i \alpha_{i,k}. \qquad (19)$$

Substituting the expression for weights $\Omega_i$, in EQN. (18) into the feedback gradient on the right-hand side of EQN. (17) and applying the chain rule gives:

$$\Omega^T \frac{\partial \psi(s_{i-1}, u_i)}{\partial \Omega^{(k)}} = A_i^T \frac{\partial \Psi_i^T \psi(s_{i-1}, u_i)}{\partial s_{i-1}} \frac{\partial s_{i-1}}{\partial \Omega_i^{(k)}} \qquad (20)$$

$$= \underbrace{2 a_s A_i^T K_i D_i^T}_{\Lambda_i} \frac{\partial s_{i-1}}{\partial \Omega_i^{(k)}},$$

where the partial derivation is evaluated using the Gaussian tensor-product kernel of EQN. (11), where $K_i \triangleq \text{diag}(\Psi_i^T \psi(s_{i-1}, u_i))$ is a diagonal matrix with eigenvalues $K_i^{(j,j)} = \mathcal{K}_{a_s}(s_j, s_{i-1}) \cdot \mathcal{K}_{a_u}(u_j, u_i)$ and $D_i \triangleq [(s_{-1}-s_{i-1}), \ldots, (s_{m-2}-s_{i-1})]$ is the difference matrix between state centers of the filter and the current input state $s_{i-1}$. The gradient coefficients in EQN. (20) can be collected into a matrix $$\Lambda_i \triangleq \frac{\partial s_i}{\partial s_{i-1}} = 2 a_s A_i^T K_i D_i^T,$$

which is called the state-transition gradient. Substituting EQN. (20) into EQN. (17) gives the following recursion:

$$\frac{\partial s_i}{\partial \Omega_i^{(k)}} = \Lambda_i \frac{\partial s_{i-1}}{\partial \Omega_i^{(k)}} + I_{n_s}^{(k)} \psi(s_{i-1}, u_i)^T.$$

The gradient $$\frac{\partial s_i}{\partial \Omega_i^{(k)}}$$

measures the sensitivity of $s_i$, the state output at time i, to a small change in the k-th weight component, taking into account the effect of such variation in the weight values over the entire state trajectory $s_0, \ldots, s_{i-1}$. In this evaluation, the initial state $s_0$, the input sequence $u_1^i$, and the remaining weights ($\Omega_i^{(j)}$, where $j \ne k$) are fixed. The state gradient $$\frac{\partial s_i}{\partial \Omega_i^{(k)}}$$

is back-propagated with respect to a constant weight via feedback.

Clearly EQN. (21) is independent of any teacher signal or error that the system may incur in the future and can be computed entirely from the observed data. Therefore, the state gradients can be forward propagated. Since the initial state is user-defined and functionally independent of the filter weights, by setting $$\frac{\partial s_1}{\partial \Omega_i^{(k)}} = 0,$$

the ensuing recursions in EQN. (21) becomes:

$$\frac{\partial s_1}{\partial \Omega_i^{(k)}} = I_{n_s}^{(k)}(s_0, u_1)^T. \qquad (22)$$

By induction, the basis functions can be factored out and the recursion expressed as:

$$\frac{\partial s_i}{\partial \Omega_i^{(k)}} = \Lambda_i V_{i-1}^{(k)} \Psi_{i-1}'^T + I_{n_s}^{(k)} \psi(s_{i-1}, u_i)^T \qquad (23)$$

$$= [\Lambda_i V_{i-1}^{(k)}, I_{n_s}^{(k)}][\Psi_{i-1}', \psi(s_{i-1}, u_i)]^T$$

$$= V_i^{(k)} \Psi_i'^T$$

where $\Psi_i' \triangleq [\Psi_{i-1}', \psi(s_{i-1}, u_i)] \in \mathbb{R}^{n_\psi \times i}$ are centers generated by the input sequence and forward-propagated states from a fixed filter weight $\Omega_i$, and $V_i^{(k)} \triangleq [\Lambda_i V_{i-1}^{(k)}, I_{n_s}^{(k)}] \in \mathbb{R}^{n_s \times i}$ is the updated state-transition gradient, with initializations $\Psi_1' = [\psi(s_0, u_1)]$ and $V_1^{(k)} = I_{n_s}^{(k)}$.

Combining EQN. (17) with EQN. (23) gives the error gradient:

$$\frac{\partial \varepsilon_i}{\partial \Omega^{(k)}} = -e_i^T \mathbb{I} V_i^{(k)} \Psi_i'^T. \qquad (24)$$

Updating the weights in the negative direction yields:

$$\Omega_{i+1}^{(k)} = \Omega_i^{(k)} + \eta \Psi_i' (\mathbb{I} V_i^{(k)})^T e_i \qquad (25)$$

$$= \Psi_i A_i^{(k)} + \eta \Psi_i' (\mathbb{I} V_i^{(k)})^T e_i$$

$$= [\Psi_i, \Psi_i'] \begin{bmatrix} A_i^{(k)} \\ \eta (\mathbb{I} V_i^{(k)})^T e_i \end{bmatrix}$$

$$\triangleq \Psi_{i+1} A_{i+1}^{(k)}, \qquad (26)$$

where $\eta$ is the learning rate. Because learning is provided in a LMS fashion in the RKHS, the conventional tradeoff of speed and accuracy exists, and the same rules as for the KLMS algorithm can be utilized.

Since the centers in a KAARMA network naturally forms feature clusters during training. Its growth can be curbed by evaluating each new center from the feature update $\Psi'$ with the existing ones. FIGS. 3A and 3B include pseudocode illustrating a KAARMA algorithm and a quantization algorithm, respectively. The algorithm of FIG. 3B outlines the quantization procedure of quantized KAARMA (or QKAARMA), which constrains the network growth in the last five lines of the KAARMA algorithm of FIG. 3A. Each new center from the feature update $\Psi'$ is compared with the existing ones. If the minimum joint distance (input and state) is below a quantization threshold q, the new center $\Psi'^{(i)} \triangleq \psi(s_i', u_i')$ is simply discarded, and its corresponding coefficients A'(i), where (i) indicates the i-th row, are added to the nearest existing neighbor's (indexed by j*), thus updating the weights without growing the network structure.

KAARMA for Automatic Speech Recognition

Automatic speech recognition (ASR) research can involve connectionist networks that can focus on a frame-to-frame predictive or discriminative model, by computing the local observation probability at each time step. This can be based upon an assumption that each frame of the speech signal can be labeled or assigned a desired value. Alternatively, certain speech recognition tasks can be treated as grammatical inference problems, exactly like syntactic pattern recognition involving the Tomita grammars.

As a proof of concept, the TI-46 corpus of isolated English digits was used for experimental testing in this disclosure. The corpus of speech was designed and collected at Texas Instruments, Inc. in 1980, consisting of utterances from 16 speakers (eight males and eight females) each speaking the digits "zero" through "nine" 26 times. Of the 4160 possible utterances, 4000 were used in the subsequent experimental testing. These utterances were further partitioned randomly into a training set (of 2700 utterances with an equal number of male/female utterances and digits: 135 utterances per gender, per digit) and a testing set (of 1300 utterances with an equal number of male/female utterances and digits: 65 utterances per gender, per digit).

To help align each utterance and reduce the number of non-speech data points used in computation, each utterance can be normalized with respect to its maximum absolute amplitude, then truncated automatically into the smallest window containing all voiced regions using a simple threshold-based end-point detection algorithm. Next, each truncated utterance was analyzed on 25 ms speech frames at 100 fps. Each frame was Hamming windowed, filtered by a first-order pre-emphasis filter ($\alpha$=0.95). The magnitude spectrum from the discrete Fourier transform (DFT) can be computed and scaled by the mel-scale triangular filter bank. The output energy can then be log-compressed and transformed via the DCT to cepstral coefficients.

For the ASR experiment, ten 1-vs-all KAARMA networks were trained, one for each digit. Each training utterance was represented by a sequence of 12 MFCCs and assigned a single label of ±1 based on the target class. The QKAARMA algorithm was used for training, with hidden states $\in \mathbb{R}^3$, kernel parameters $a_s=a_u=2.5$, learning rate $\eta=0.05$, and quantization threshold q=0.81. For the complete ASR system performance, each test utterance passes through all ten classifiers, and the digit corresponding to the KAARMA network with the largest output value was selected as the recognition result.

The classification performance of this KAARMA ASR system is summarized in the training and testing confusion matrices in the training and testing tables in FIG. 4A. The drop in performance from single 1-vs-all classifiers to the overall recognition system and from the training set to the testing set is expected, due to overfitting and the fact that errors in individual classifiers can accumulate across the entire testing set for the final 10-vs-10 word recognition system. Another contributing factor is that many digits share similar acoustic features in their temporal representation. Theoretically, recurrent networks that are trained using the gradient descent method are ill-suited for learning long-term dependencies. If two different digits converge to the same set of acoustic features after enough time has elapsed or share significant overlap during utterances, it becomes much more difficult for recurrent networks such as the KAARMA algorithm to distinguish the two. To better illustrate this phenomenon, each of the 10 digits present in the corpus is broken up into sub-word speech units of phonemes in the table of FIG. 4B.

One simple way to circumvent this problem for certain digits, without changing the experiment, is to simply reverse the order of the acoustic features. Digits that used to share the same trailing phoneme may end up in different ones (of course the converse can also happen for certain digits). In the table of FIG. 4C, the results are tabulated for individual 1-vs-all classifiers using both the natural left-to-right temporal sequence convention and the reversed ordering (right-to-left) during training and testing of the digit corpus. The true positive (TP), false positive (FP), and 1-vs-all classification accuracy are listed for each two classifiers, with the better performance in each category between the two orderings highlighted in bold font.

If the ASR system is constructed by selecting the 1-vs-all classifier with the higher accuracy between the two ordering categories for each digit, the testing set recognition rate of this modified ASR can be improved over the uniform sequence ordering. However, if both classifiers are combined by multiplying the softmax scores, the performance can be further improved, as shown in the table of FIG. 4D.

KAARMA Chain

A KAARMA chain approach can be formulated for isolated word recognition under a statistical framework. Commonly, a hidden Markov model (HMM) framework is used for speech recognition. In the HMM framework, a speech signal, specifically the sequence of acoustic feature vectors $\mathcal{U} = \{u_1, u_2, \ldots, u_{n_u}\}$, is generated by a finite state automaton comprising L states $S=\{s_1, s_2, \ldots, s_{n_s}\}$ under a probabilistic framework. An HMM is equivalent to a stochastic regular grammar with each speech unit associated with a specific Markov model $M_i$ comprising states from S according to a predefined topology. The left-right (Bakis) model is the most commonly used topology for speech recognition. States are aligned from left to right to form a single Markov chain, indexed incrementally and with only self- or right-transitions allowed, i.e., $a_{i,j}=0$, for j<i. Furthermore, the initial state is fixed at state $s_1$. Left-right HMMs are able to model the temporal properties of speech.

The training and recognition criteria for HMMs are based on maximizing a posteriori probability $Pr(M_i|\mathcal{U})$ that the observation U has been produced by the HMM $M_i$. Using Bayes' rule, the expression can be rewritten as:

$$Pr(M_i|\mathcal{U}) = \frac{Pr(\mathcal{U}|M_i)Pr(M_i)}{Pr(\mathcal{U})}, \quad (27)$$

where $Pr(\mathcal{U}|M_i)$ is the maximum likelihood estimate (MLE) criterion, $Pr(\mathcal{U})$ is constant during recognition, and the a priori probability $Pr(M_i)$ is an appropriate language model.

The statistical recognition criterion can be solved directly using the KAARMA algorithm. The maximum a posteriori (MAP) criterion can be defined as:

$$M^* = \underset{M}{\operatorname{argmax}} Pr(M|\mathcal{U}), \quad (28)$$

where M is the inference model, which is equivalent to maximizing the a posterior state sequence or most probable state sequence for each model.

Figure 5:
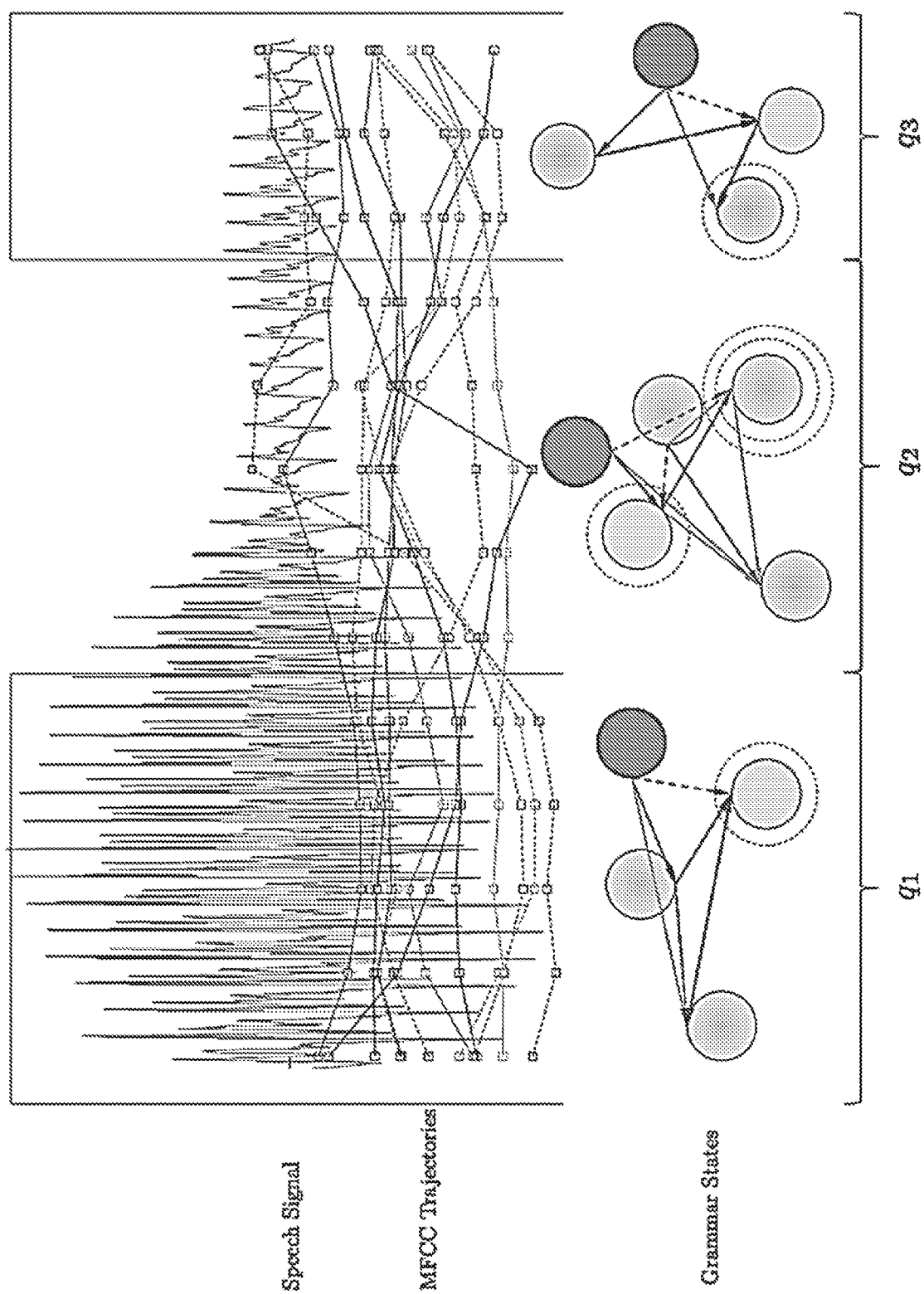
FIG. 5 illustrates an example of a KAARMA chain of 3 grammar states in accordance with various embodiments of the present disclosure.

Define the states in a KAARMA chain as context-free grammars (e.g., phoneme, syllable, word, etc.), denoted by $\mathcal{Q} = \{q_1, q_2, \ldots, q_L\}$ (this distinction is made to not confuse a grammar state $q_i$ with the KAARMA internal state variables $s_i$, i.e., $q_i \in \{s_1, s_2, \ldots, s_{n_s}\}$.). Under this formulation, a single (global grammar) KAARMA network trained on the entire observation trajectory $\mathcal{U} = \{u_1, u_2, \ldots, u_{n_u}\}$ can be viewed as:

$$\tilde{y}_i = \frac{\exp(y_i^{(t)})}{\sum_j \exp(y_j^{(t)})} = Pr(\mathcal{Q} = q = 1 | \mathcal{U}), \quad (29)$$

where $y_i$ is the output of a KAARMA network trained to recognize or classify the grammar $q=1$. The softmax function can be used to ensure that the posterior estimates are non-negative and sum to one. To improve the classification results, several KAARMA networks that specialize in different regions of a word can be trained. For each isolated word, the observation sequence can be partitioned into L equal segments. Each segment can be assigned a grammar state and a separate KAARMA network can be used to learn its classification grammar. FIG. 5 shows an example of a KAARMA chain of 3 grammar states, used to the digit "7."

Next, the state transitions for the KAARMA chain can be fixed at $a_{i,j}=1$ for $j>i$. KAARMA is able to handle nonstationarities by leveraging their internal hidden states $s_1$. Unlike the restricted structure of a traditional left-to-right model, the hidden state $s_i$ in each grammar state are free to form transitions that best fit the available data, i.e., an ergodic model. In the KAARMA chain formulation, the recognized word can be given by the following MAP criterion:

$$M^* = \underset{M}{\operatorname{argmax}} \prod_i^L Pr\left(q_i = M \mid u_{(i-1)*n_u/L+1}^{i*n_u/L}\right). \quad (30)$$

A major advantage of performing adaptive filtering in the RKHS is the freedom to choose the input representation as long as the appropriate reproducing kernel is used. By having separate formulations of the exogenous input u and the internal state s vectors, the KAARMA algorithm imposes no restriction on the relationship between the two signals in the original input space. This enables it to work directly with nonnumeric data such as spike trains. The KAARMA chain paradigm will be applied for a biologically-plausible speech recognition system. For each speech signal, biologically inspired features can be extracted to mimic the filtering performed by the human auditory system. The Schoenberg kernel can used be as a suitable reproducing kernel (or spike kernel) for spike trains. The spike kernel transforms the spike trains into a high dimensional feature space (e.g., Hilbert space).

Spike-Based Acoustic Features

First, a gammatone filterbank can be applied to each acoustic signal and its outputs converted into spike trains using leaky integrate-and-fire neurons with spike rate adaptation and a refractory current. The neuron parameters are resistance $R_m=10^2$, time constant $\tau_m=10^{-2}$, spike threshold $V_{th}=-55\times 10^{-3}$, spike delta $V_{spike}=0.5$, reversal potential for spike-rate adaptation $E_k=-2\times 10^{-1}$, and reset potential $V_{reset}=-8\times 10^{-2}$. This formulation is motivated by the mechanical to electrical transduction in the cochlea. Different regions of the basilar membrane vibrate to particular sound frequencies, in response to fluid flow in the cochlea. Sensory hair cells in the organ of Corti then convert the mechanical response to electrical signals which travel along the auditory nerve to the brain for processing.

Figure 6A:
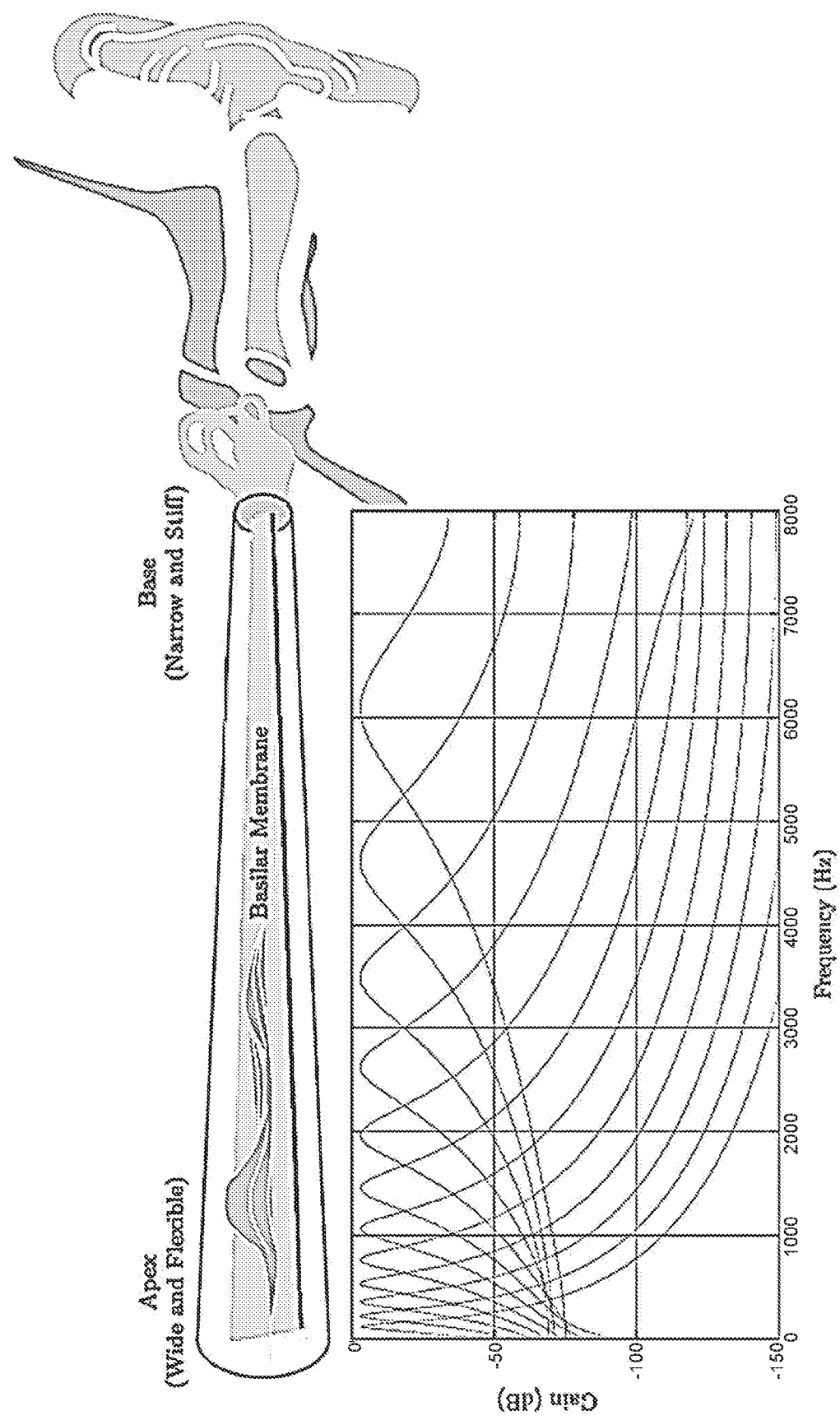
FIGS. 6A through 6C illustrate an example of segmentation of frequency responses of a 12-filter gammatone filterbank in accordance with various embodiments of the present disclosure.
Figure 6B:
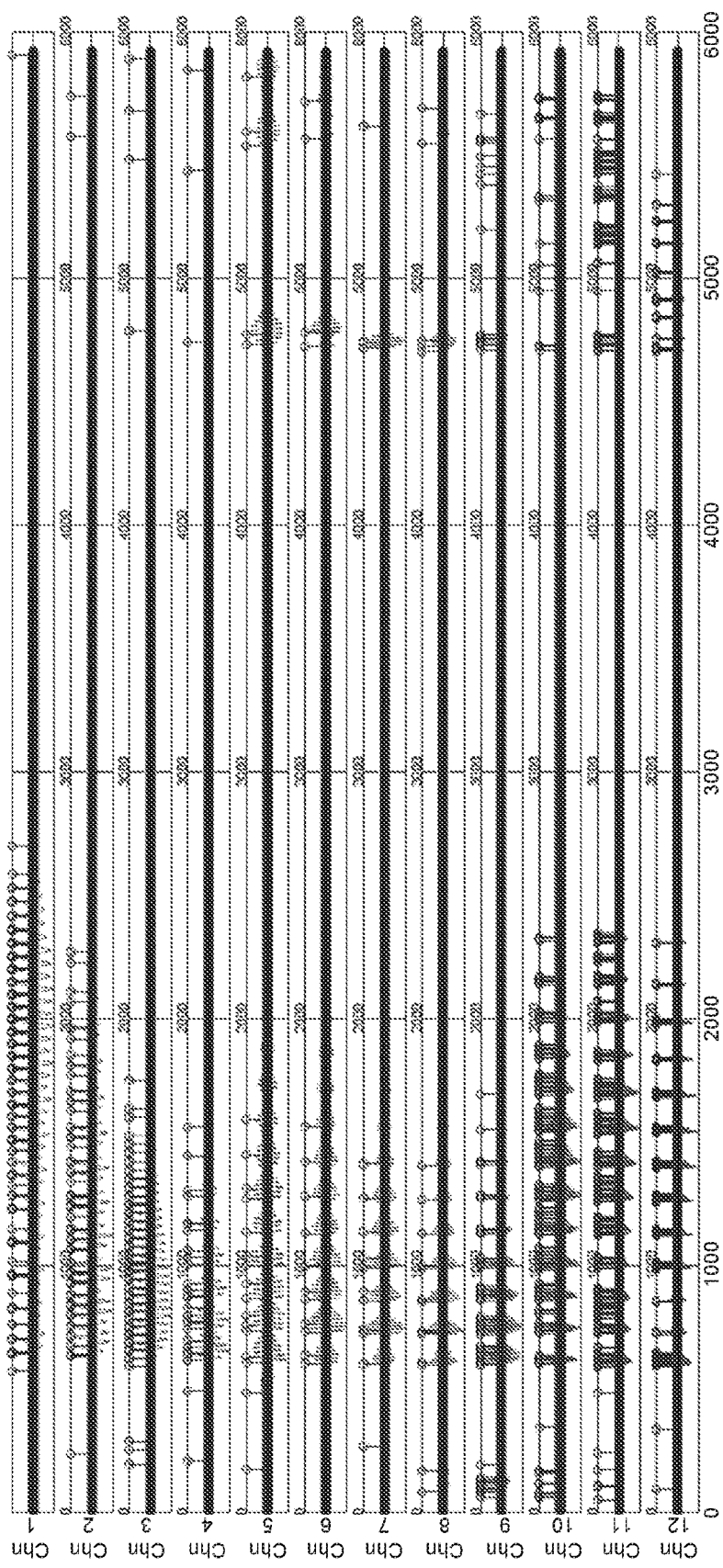
Figure 6C:
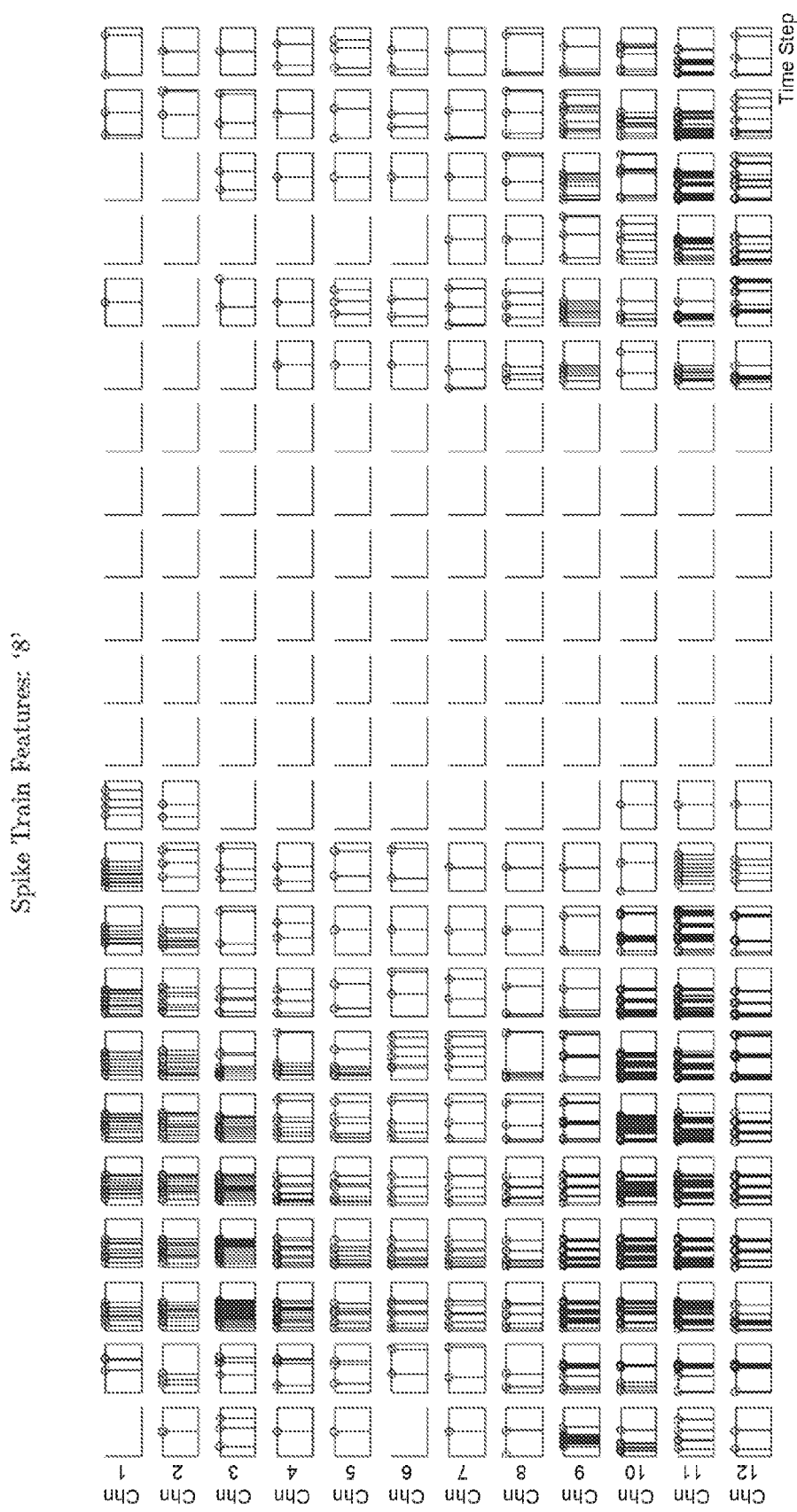

The gammatone filterbank simulates the mechanical response of the cochlea in which the output of each filter models the frequency response of the basilar membrane at a particular location. FIG. 6A illustrates an example of frequency responses of a 12-filter gammatone filterbank with center frequencies equally spaced between 50 Hz and 8 kHz on the ERB-rate scale. It can be defined in the time domain by the impulse response:

$$g(t) = at^{n-1} e^{-2\pi bt} \cos(2\pi f_c t + \phi), \quad (31)$$

where $f_c$ is the center frequency (in Hz), $\phi$ is the phase of the carrier (in radians), a is the amplitude, n is the filter order, b is the filter bandwidth (in Hz), and t indicates time (in s). FIG. 6B shows the gammatone filter bank outputs for an utterance of the digit "8," superimposed with the corresponding spike trains generated using leaky integrate-and-fire (LIF) neurons. Next, the spike trains can be segmented into frames the same way as the MFCCs, with a frame duration of 25 ms and rate of 100 fps. FIG. 6C shows an example frame representation of the spike train inputs for the same digit "8" utterance. Again, the positive class is replicated 3 times and this training set is used once to train the KAARMA classifiers. For the isolated word recognition problem, the spike frames are used directly as features (with hidden states $s \in \mathbb{R}^3$, kernel parameters $a_s=4$, $a_u=6$, learning rate $\eta=0.1$, quantization threshold $q=0.25$). To reduce overfitting the parameters were not fully optimized over their respective ranges. The recognition performance is also shown using firing rates obtained from the spike frames (with hidden states $s \in \mathbb{R}^3$, kernel parameters $a_s=a_u=5$, learning rate $\eta=0.1$, quantization threshold $q=0.55$).

Figure 7A:
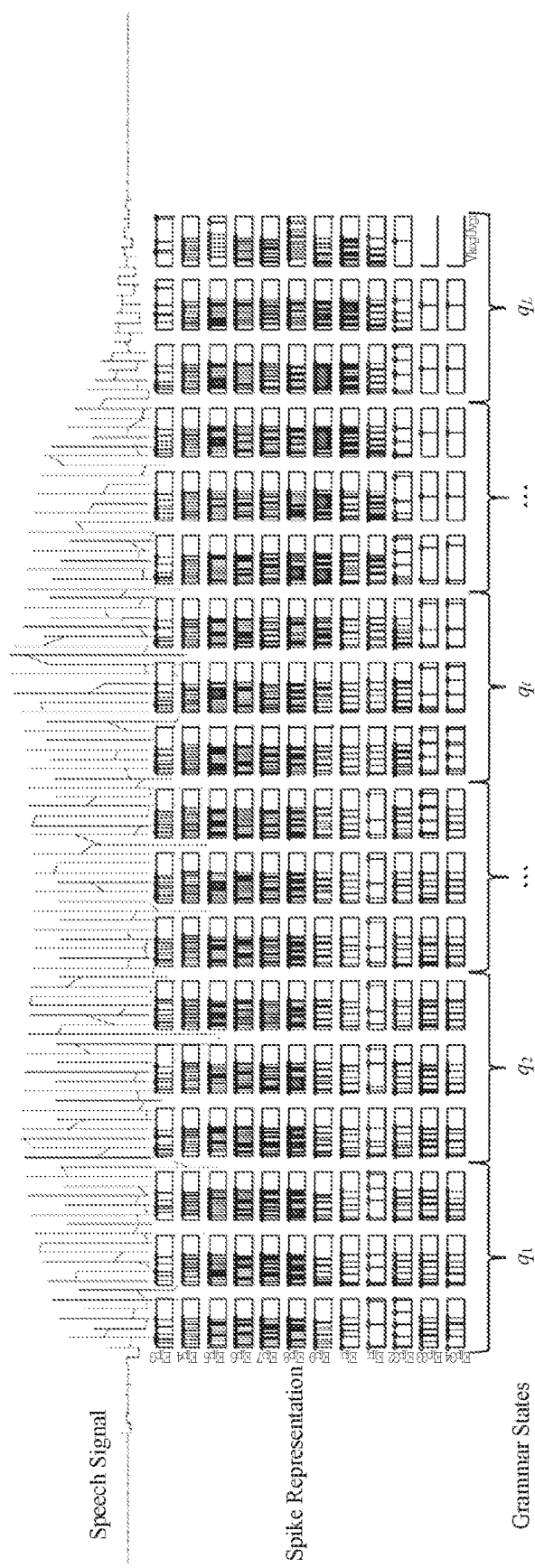
FIGS. 7A through 7C illustrate an example of word recognition using pulse-based KAARMA chain in accordance with various embodiments of the present disclosure.
Figure 7B:
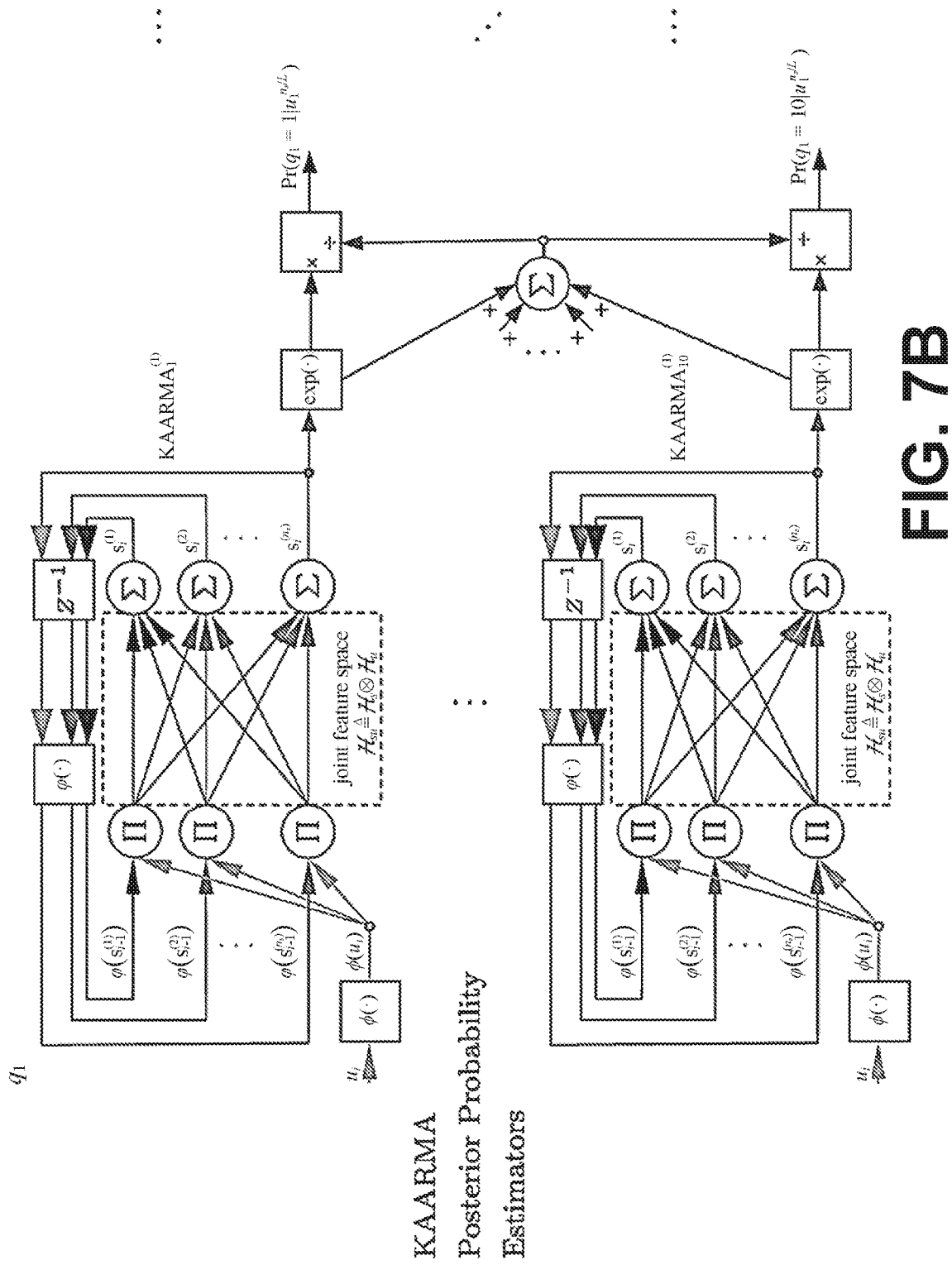
Figure 7C:
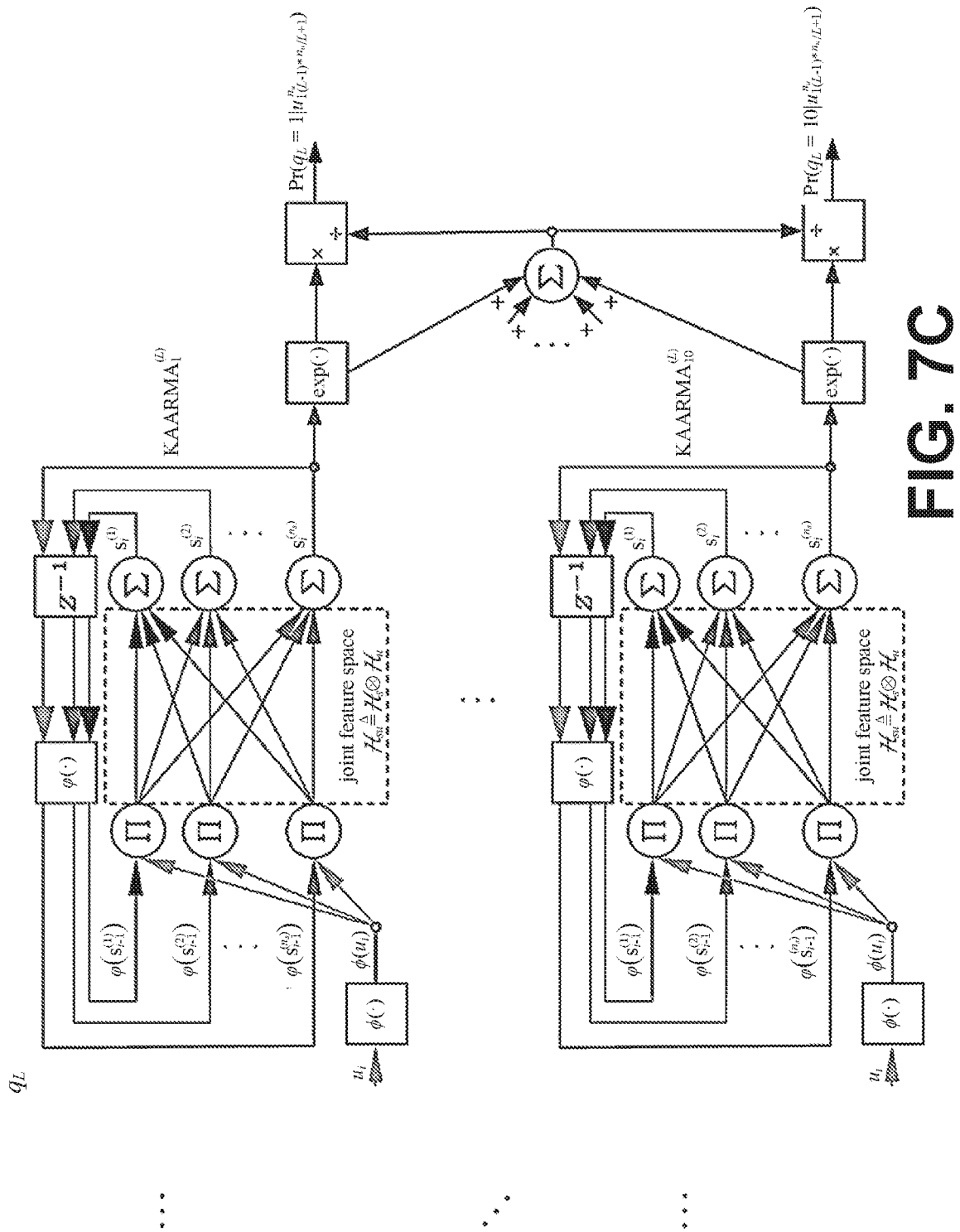

FIGS. 7A-7C illustrate an overview of the spike-based ASR system using KAARMA chains for isolated word recognition. FIG. 7A shows the segmentation of frequency responses and FIGS. 7B and 7C show an example of portions of the KAARMA chain for work recognition. For a 5-state KAARMA chain, the recognition results are shown in the tables of FIGS. 8A and 8B. The spike-based performances are summarized and compared to the performance of a 5-state HMM with a mixture of 8 Gaussians in the table of FIG. 8C.

The state-of-the-art bioinspired digital performance using a liquid state machine (LSM) on the TI-46 digit corpus has been reported. For the multispeaker spoken digit task with 1590 speech samples (80% used for training and remaining 20% for testing) and training epoch of 500, the final classification rate for the 77-channel spike input LSM was 92.3%. The spike or pulse-based speech recognition of this disclosure achieves an accuracy of 95.23% for a larger speech set with 4000 samples (67% for training and 33% for testing), using a single training epoch (where only the desired class or 10% of the training data is replicated 3 times).

Furthermore, producing a constant output for a time-varying liquid state is a major challenge for a LSM, since the memory-less readout has to transform the transient and nonstationary states of the liquid filter into a stable output without any attractor states to rely on. For the KAARMA formulation using pulse-based signals, once the stable dynamics are learned, a finite state machine or deterministic finite automata (DFA) can easily be extracted from the binary time sequences, where all the information of the input is contained in its temporal evolution, e.g., the interspike intervals of individual spike trains. The limitations of LSM and the advantages of the DFA learned from the KAARMA algorithm is illustrated here for completeness.

Figure 9A:
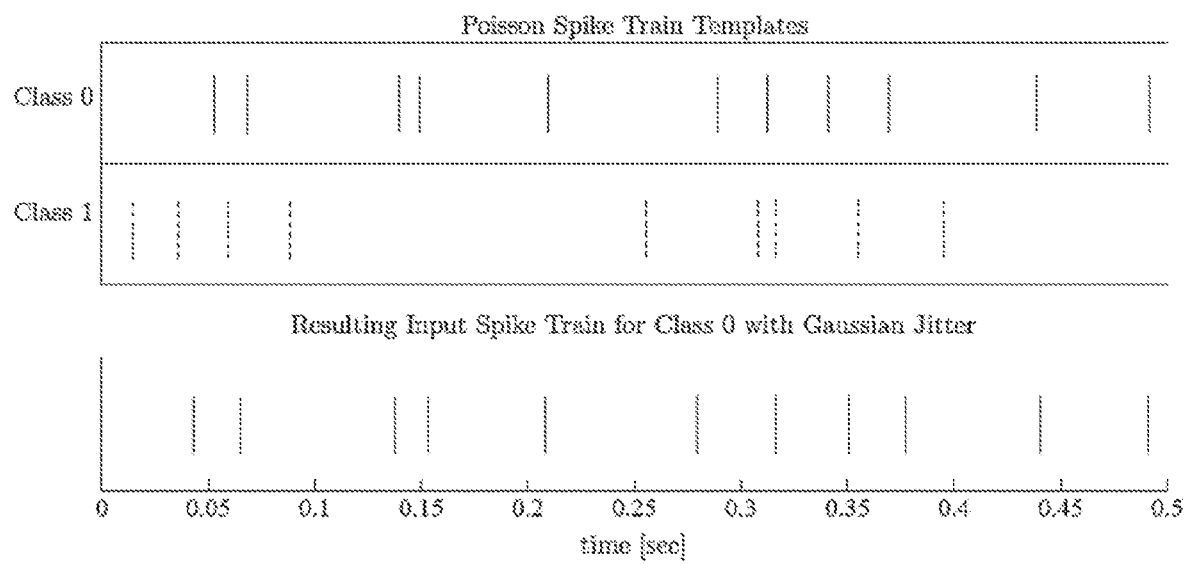
FIGS. 9A through 9C illustrate examples of spike train templates in accordance with various embodiments of the present disclosure.

Spike Train Classification using DFA learned from the KAARMA algorithm. Two Poisson spike trains of frequency 20 Hz and duration 0.5 s are generated as templates for two classes 0 and 1. FIG. 9A illustrates Poisson spike train templates (solid spikes for class 0 and dashed spikes for class 1). Actual spike trains used for training and testing are noisy versions of the templates, with each spike timing varying by a random amount, according to a zero mean Gaussian distribution with standard deviation or Gaussian jitter of 4 ms. An example of a jittered Class 0 spike train is shown at the bottom of FIG. 9A. The training set consisted of 500 realizations, with another 200 forming the independent test set. Due to the random displacement of spikes, it becomes impossible to recognize spike trains generated from a specific template using a single interspike interval. Furthermore, as nonnumeric data, there are no spatial cues to rely on.

The liquid filter was a randomly connected recurrent neural microcircuit comprising 135 integrate and fire neurons, with 20% of the population randomly set as inhibitory. A readout neuron modeled as a perceptron or threshold gate was trained to classify the spike trains. The task of this threshold gate is to output 0 or 1 corresponding to the template used to generate the input spike train. The state of the microcircuit was sampled every 25 ms by low-pass filtering the response. Supervised learning was applied to the set of training examples in the form: (state $x^M(t)$, target y(t)) to train a readout function $f^M$. The experimental setup for the LSM is described in "Learning-tool: analysing the computational power of neural microcircuits (version 1.0)" (The IGI LSM Group, Jun. 11, 2006, http://www.lsm.tu-graz.at/download/learning-tool-1.1-manual.pdf), which is hereby incorporated by reference in its entirety.

Figure 9B:
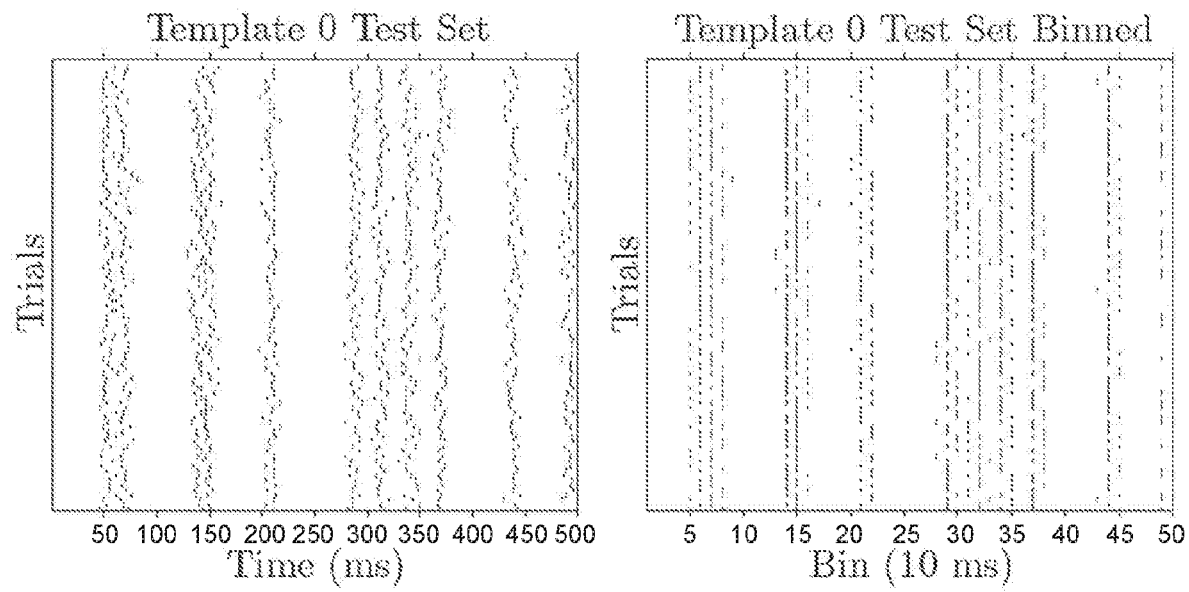
Figures 9C, 10:
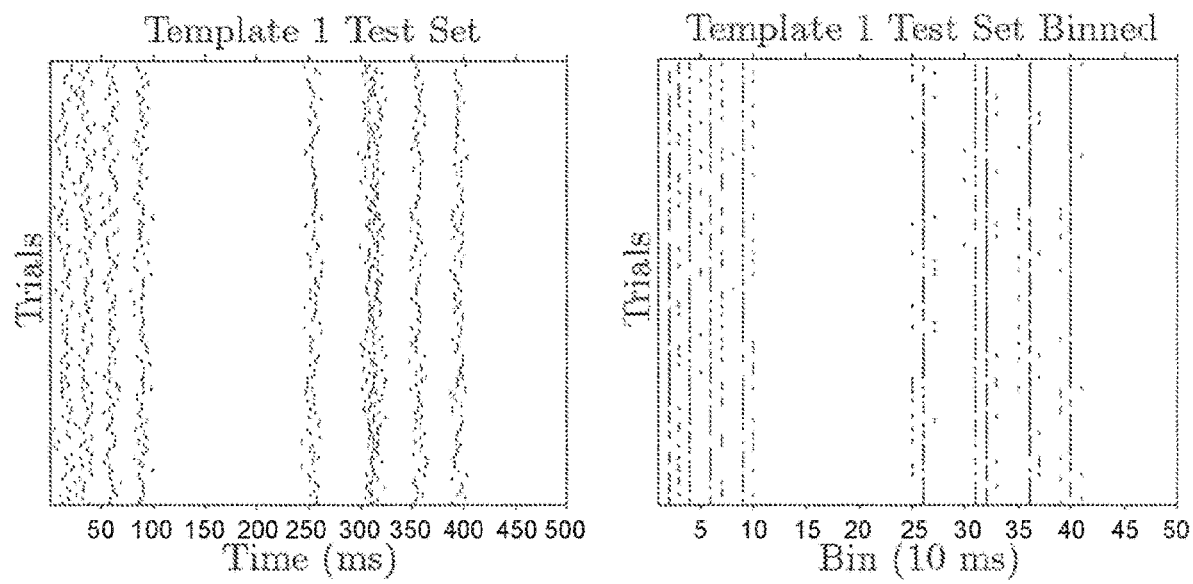
FIG. 10 includes a table comparing performance of a liquid state machine (LSM) using various supervised learning techniques in accordance with various embodiments of the present disclosure.

The QKAARMA network is trained directly on the spiking stimuli, downsampled using 10 ms bins such that for multiple spike count in a bin, only a single 1 is recorded. Each jittered version of the target template forms a binary string of length 50. Note that the tensor-product formulation allows KAARMA networks to operate directly on spike train inputs via an appropriate spike train kernel. Here, binning is used to produce an exact binary-input finite state machine and to compare with the binned performance of the LSM. FIGS. 9B and 9C illustrate examples of test set spike trains in their original spike timings (left) and in the binned form (right) separated by template class 0 and 1, respectively. Hidden states of dimension 3 ($s \in \mathbb{R}^3$) were used with the kernel parameter for both the states and the binary inputs set at $a_s=a_u=1$. The learning rate was fixed at $\eta=0.1$, with a quantization threshold of q=0.4 and a DFA extraction quantization threshold of $q_{DFA}=0.11$.

The performances of the LSM using various supervised learning techniques (linear classification, parallel delta (p-delta) rule, linear regression, and LevenbergMarquardt (LM) backpropagation on a two-layer NN with 5 hidden units), measured by the correlation coefficient (CC), mean absolute error (MAE), error score, and mean squared error, are summarized in the table of FIG. 10. The best performance was given by the two-layer NN trained using LM backpropagation, which was trained for 48 epochs with the best validation performance at epoch 33. FIG. 11 illustrates a misclassified spike train by the LSM approach. Shown are LSM results for test input 3 with readout function trained using linear classification, p-delta rule, linear regression, and backpropagation (desired given by dashed line and estimates given by circles).

Figure 12A:
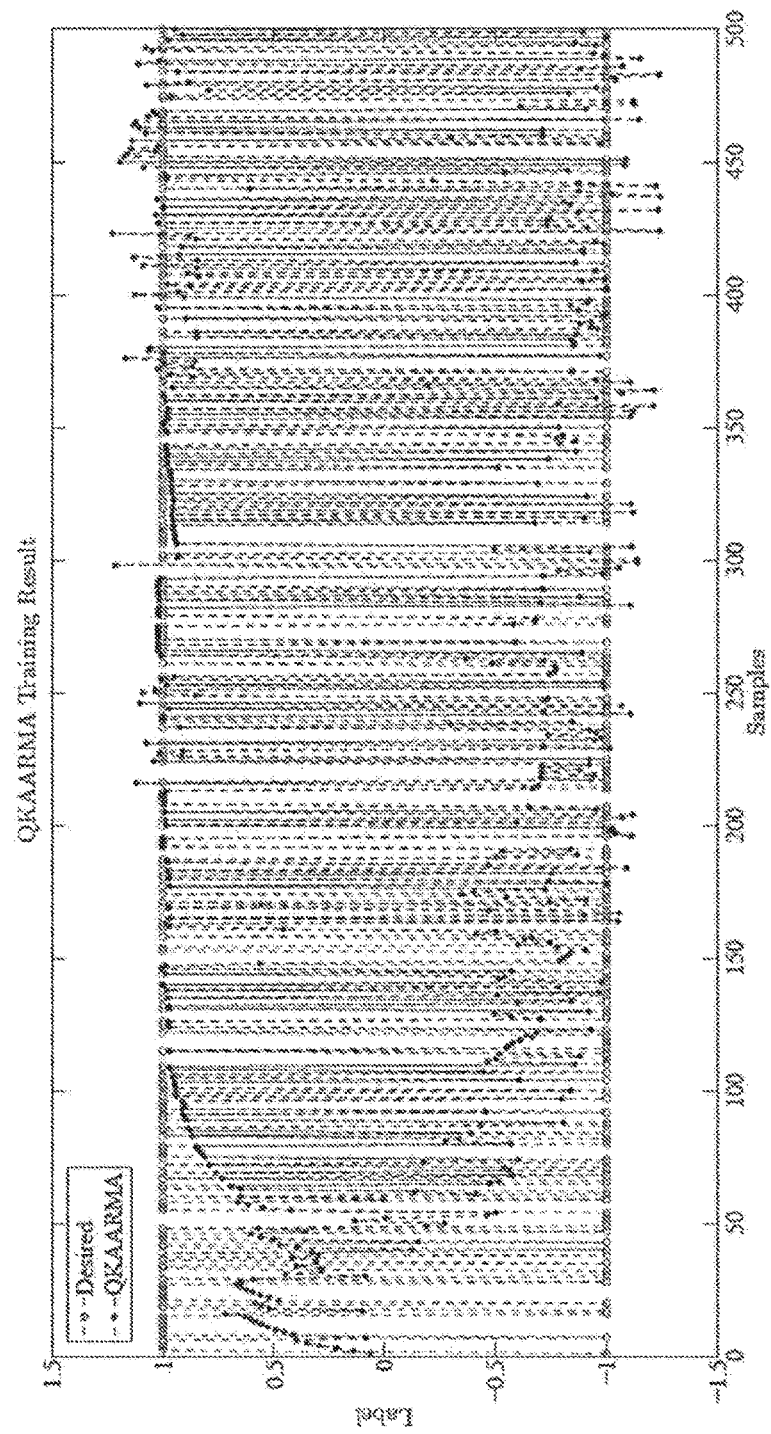
FIGS. 12A and 12B illustrate examples of online performance of quantized KAARMA (or QKAARMA) for spike train classification during training and testing in accordance with various embodiments of the present disclosure.
Figure 12B:
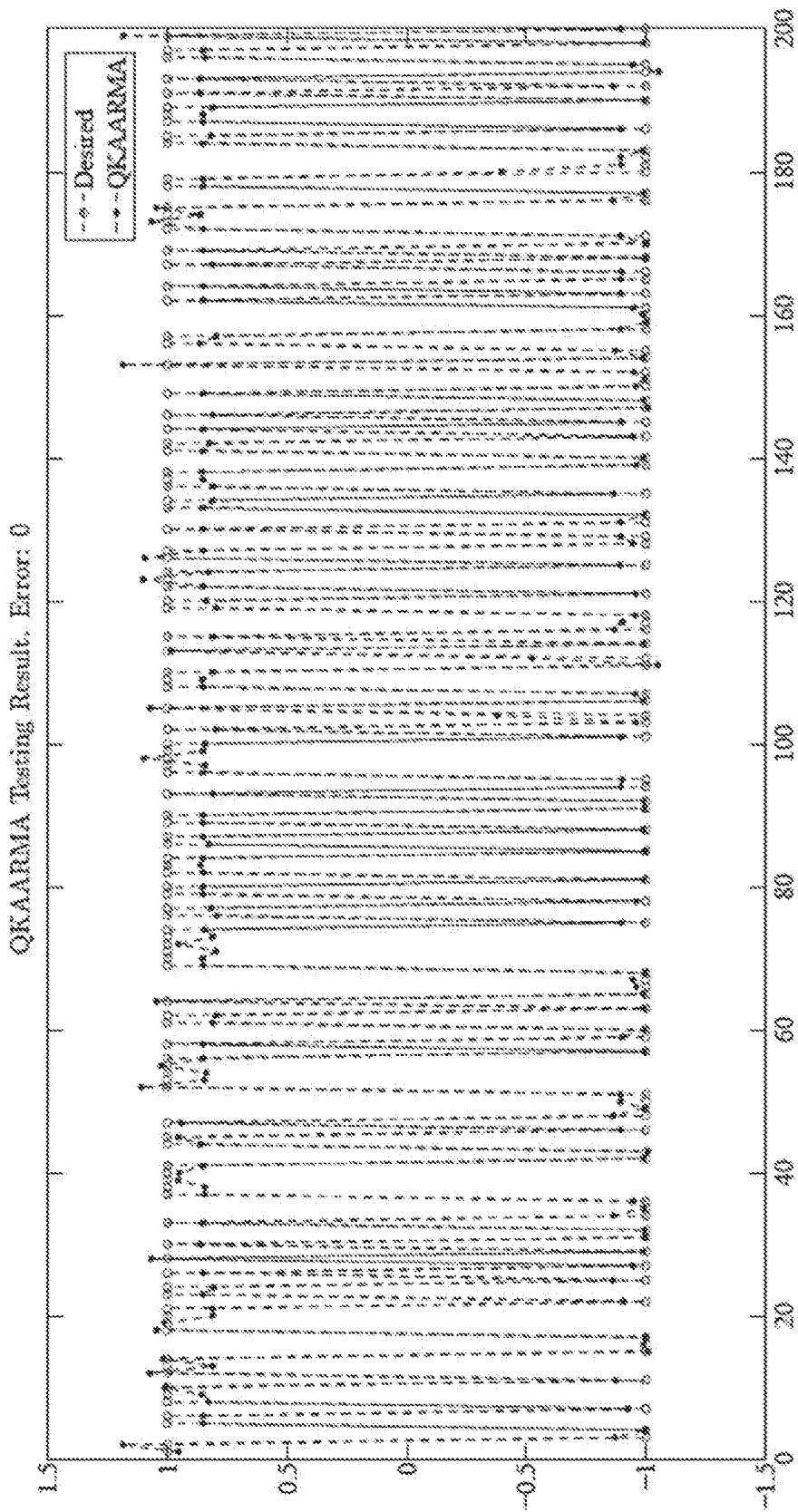

FIG. 12A shows the online performance of the QKAARMA algorithm for the spike train classification task during training. While small perturbations in the input can cause large and unpredictable dynamical changes in the liquid states $x^M$ of a LSM, the KAARMA network trained with stable states easily handled the variations in interspike intervals for each class of spike trains. The KAARMA network starts to show strong discrimination after only 60 training samples, compared to the 33 epochs (where each epoch consists of 500 training samples) needed to train a LSM readout with suboptimal performance. FIG. 12B shows the testing performance on the testing set for the spike train classification task after training was completed. The QKAARMA algorithm was able to correctly label each test stimulus after a single learning pass through the training set. For this classification task, the KAARMA algorithm easily outperformed the LSM methods.

Unlike the LSM framework (which only has one attractor state: the resting state), KAARMA networks compute with stable attractors learned directly from data and can be easily converted into simple exact solutions in the form of deterministic finite automata. FIG. 13 illustrates the minimized finite state machine for accepting all template 0 spike trains and rejecting all template 1 spike trains, and vice versa, extracted from the trained KAARMA network. Shown are minimized DFA for Poisson spike trains with Gaussian jitter of 4 ms. State transitions were every 10 ms. As can be seen, the two minimized DFA are different, corresponding to distinct grammars governing the two Poisson spiking templates. Not only does this speed up computation dramatically via simple traversal of the states in the DFA with each input, as shown in FIGS. 14A and 14B, but this also opens the door for novel applications in neuroscience.

Figure 14A:
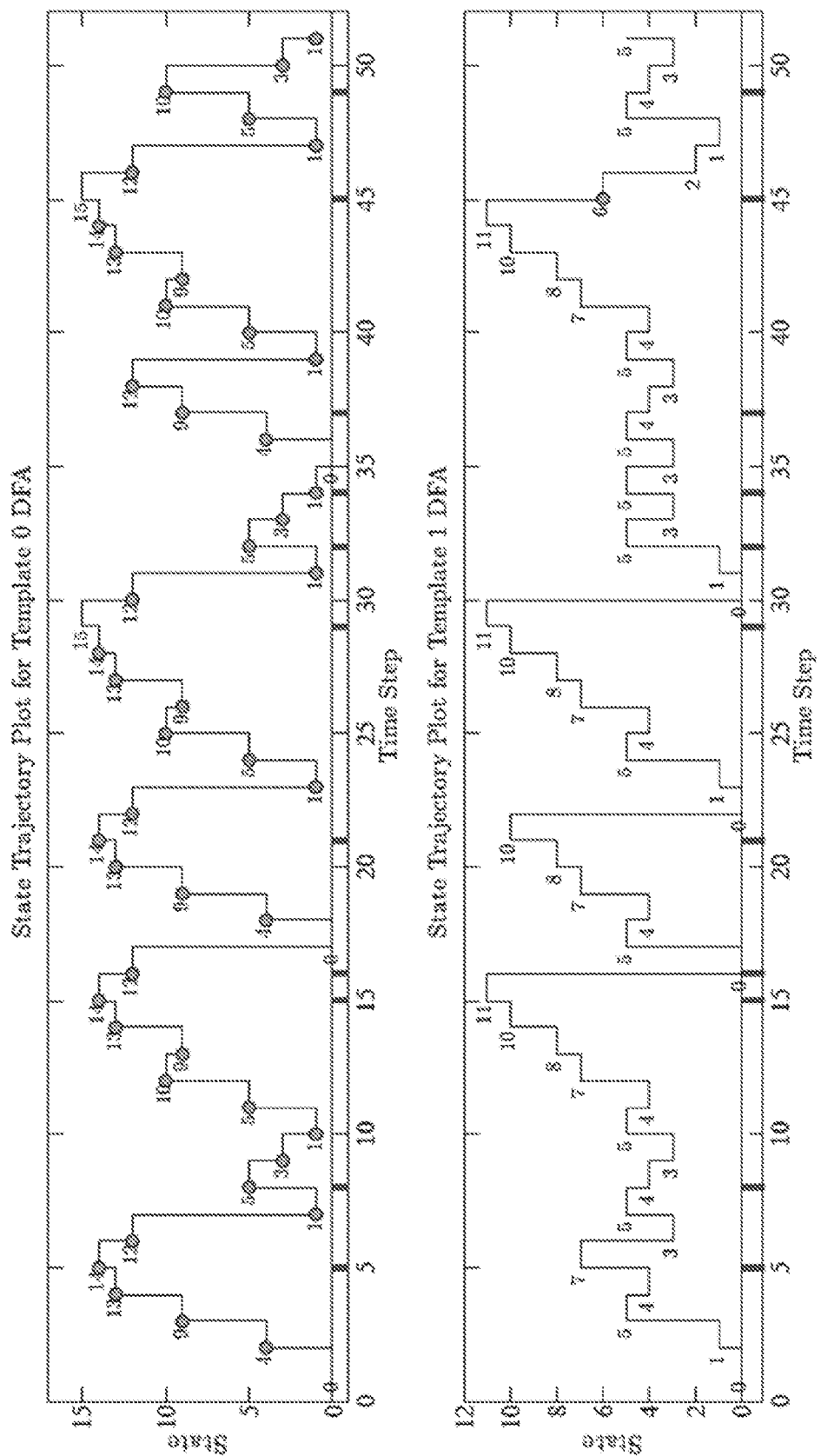
FIGS. 14A and 14B illustrated examples of state transition trajectories for a spike train generated by templates 0 and 1, respectively, in accordance with various embodiments of the present disclosure.
Figure 14B:
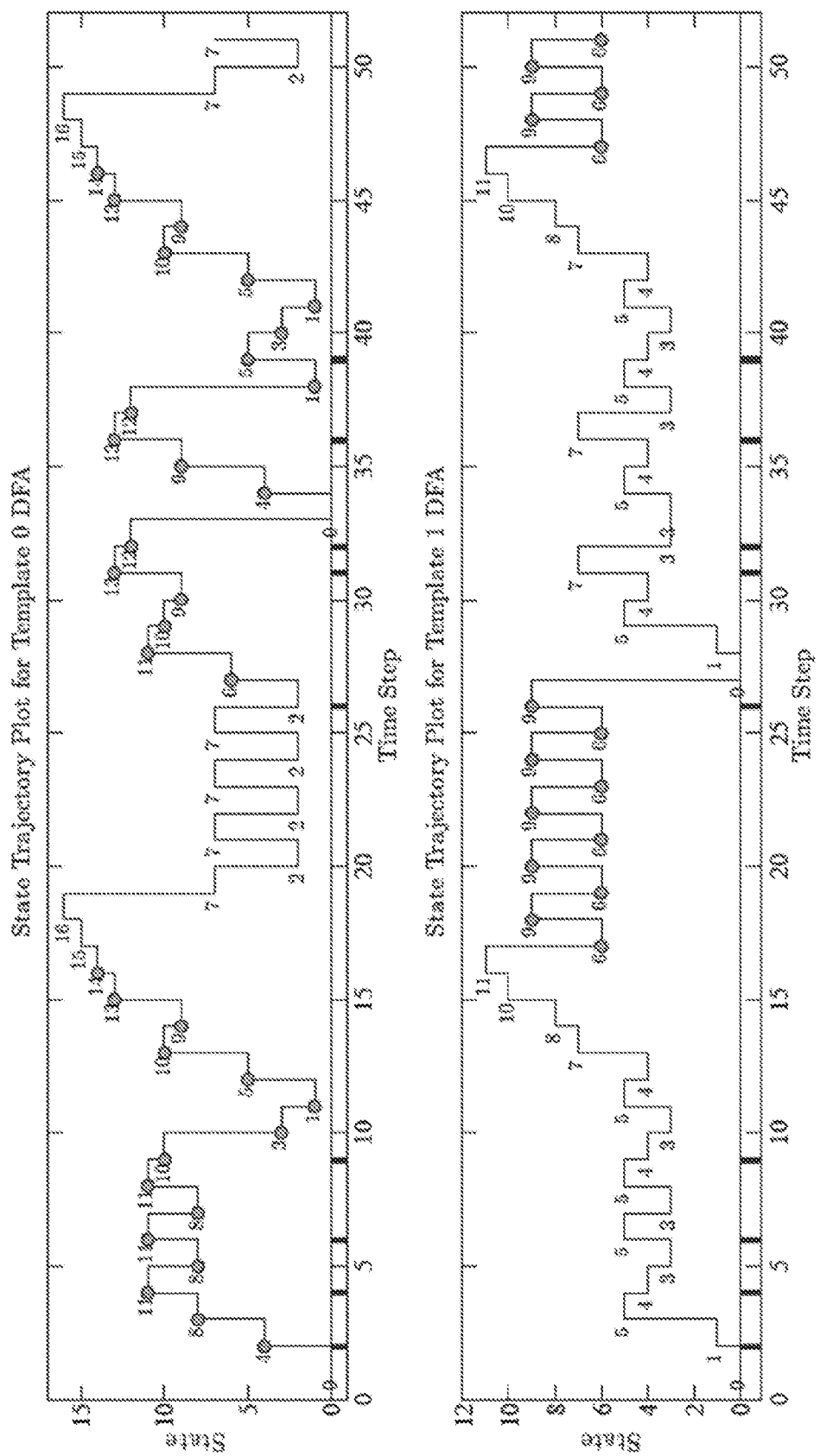

FIG. 14A shows the state transition trajectories for a spike train (shown as vertical lines at the bottom of each plot) generated by template 0, where accepted states are indicated by the dots. The final state at time step 51 gives the classification result. FIG. 14B shows the state transition trajectories for a spike train (shown as vertical lines at the bottom of each plot) generated by template 1, where accepted states are indicated by the dots. The final state at time step 51 again gives the classification result. KAARMA is able to create a state model for each class of spike train firings by extracting its grammar directly from the data. For example, analysis is possible of long-term firing rates of neurons by comparing the dynamics or grammars in stable regions associated with different behaviors.

The KAARMA algorithm's capability to deliver computationally efficient and competitive solutions to fundamental applications in automatic speech recognition has been demonstrated. Simulations show that KAARMA-based classifiers can outperform similar HMM architectures on the TI-46 digit corpus.

Figure 15:
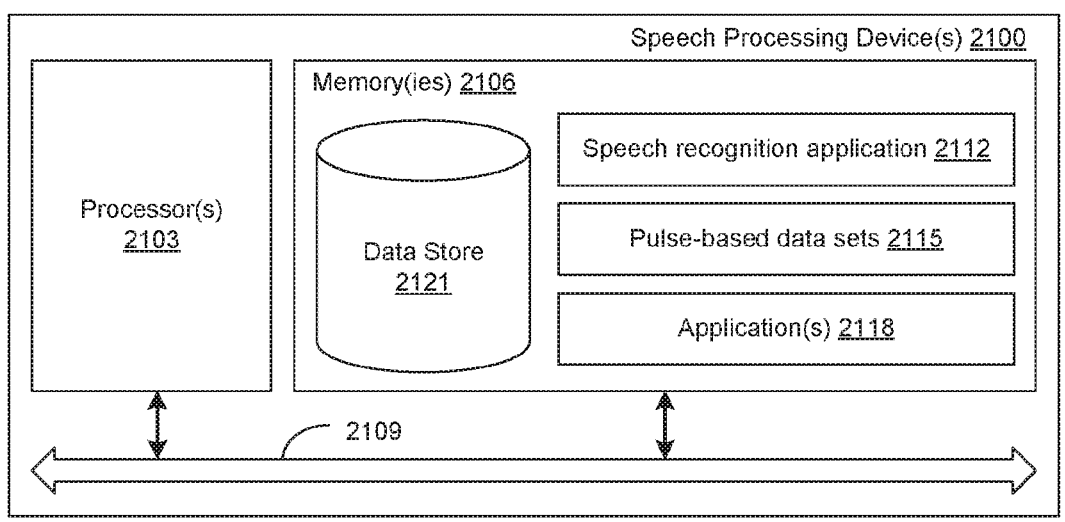
FIG. 15 is a schematic block diagram of an example of a speech processing device in accordance with various embodiments of the present disclosure.

With reference now to FIG. 15, shown is a schematic block diagram of a speech processing device 2100 according to an embodiment of the present disclosure. The speech processing device 2100 includes at least one processor circuit, for example, having a processor 2103 and a memory 2106, both of which are coupled to a local interface 2109. To this end, the speech processing device 2100 may comprise, for example, at least one server computer or like device. The local interface 2109 may comprise, for example, a data bus with an accompanying address/control bus or other bus structure as can be appreciated.

Stored in the memory 2106 are both data and several components that are executable by the processor 2103. In particular, stored in the memory 2106 and executable by the processor 2103 are a speech recognition application 2112 based upon pulse-based detection using a KAARMA network and/or KAARMA chain as previously discussed, one or more pulse-based data sets 2115 that may be used for training and/or testing of the KAARMA network and/or KAARMA chain, and potentially other applications 2118. Also stored in the memory 2106 may be a data store 2121 including, e.g., audio, video and other speech data. In addition, an operating system may be stored in the memory 2106 and executable by the processor 2103. It is understood that there may be other applications that are stored in the memory and are executable by the processor 2103 as can be appreciated.

Where any component discussed herein is implemented in the form of software, any one of a number of programming languages may be employed such as, for example, C, C++, C #, Objective C, Java®, JavaScript®, Perl, PHP, Visual Basic®, Python®, Ruby, Delphi®, Flash®, or other programming languages. A number of software components are stored in the memory and are executable by the processor 2103. In this respect, the term "executable" means a program file that is in a form that can ultimately be run by the processor 2103. Examples of executable programs may be, for example, a compiled program that can be translated into machine code in a format that can be loaded into a random access portion of the memory 2106 and run by the processor 2103, source code that may be expressed in proper format such as object code that is capable of being loaded into a random access portion of the memory 2106 and executed by the processor 2103, or source code that may be interpreted by another executable program to generate instructions in a random access portion of the memory 2106 to be executed by the processor 2103, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 2106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (M RAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 2103 may represent multiple processors 2103 and the memory 2106 may represent multiple memories 2106 that operate in parallel processing circuits, respectively. In such a case, the local interface 2109 may be an appropriate network that facilitates communication between any two of the multiple processors 2103, between any processor 2103 and any of the memories 2106, or between any two of the memories 2106, etc. The processor 2103 may be of electrical or of some other available construction.

Although portions of the speech recognition application 2112, pulse-based data sets 2115, and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The speech recognition application 2112 and pulse-based data sets 2115 can comprise program instructions to implement logical function(s) and/or operations of the system. The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Also, any logic or application described herein, including the speech recognition application 2112 and pulse-based data sets 2115 that comprises software or code can be embodied in any non-transitory computer-readable medium for use by or in connection with an instruction execution system such as, for example, a processor 2103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

In this disclosure, a simple and naive segmentation-alignment technique has been provided by first detecting the end points of the voiced regions in each isolated word utterance and then partitioning the acoustic features into segments of equal length corresponding to a fixed number of grammar states. Unlike classical HMMs, which operates on quasi-stationary states, good performance was obtained due to the KAARMA algorithm's ability to model dynamics within each arbitrarily defined state regions. This has worked well for a small vocabulary of only ten words. For more complex and realistic speech recognition problems, the grammar state concept can be applied to a more fundamental speech unit: phonemes, in order to avoid learning redundant grammar states in the construction of each word model. A dedicated KAARMA network may be trained for each phoneme using phoneme-labeled training data such as the TIMIT database. Since KAARMA network provides no native phone/frame alignment capability, it could rely on a more conventional hybrid HMM framework by leveraging a Viterbi pass to compute an alignment of frames to states and the re-estimation of duration models in order to correctly classify phones.

Furthermore, pulse-based signals can be treated as binary sequences, which can encompass all the necessary dynamics in the form of a finite state machine or DFA. Computing using DFA, extracted from a KAARMA network trained from the pulse data, can be much faster than traditional methods involving analog integration or kernel functions since the state transitions are done automatically based on pulse arrival, e.g., via a lookup table.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A speech recognition method, comprising:
converting an auditory signal into a pulse train;
segmenting the pulse train into a series of frames having a predefined duration, individual frames of the series of frames comprising a pulse sequence of the pulse train; and
identifying a portion of the auditory signal by applying the pulse sequences of at least a portion of the series of frames segmented from the pulse train to a kernel adaptive autoregressive-moving-average (KAARMA) network.

2. The speech recognition method of claim 1, wherein the pulse train is transformed into a reproducing kernel Hilbert space (RKHS) using a spike kernel.

3. The speech recognition method of claim 1, wherein the KAARMA network generates a state that identifies the portion of the auditory signal.

4. The speech recognition method of claim 1, wherein the portion of the auditory signal is a phoneme.

5. The speech recognition method of claim 1, wherein the portion of the auditory signal is a triphone.

6. A speech recognition method, comprising:
converting an auditory signal into a pulse train;
segmenting the pulse train into a series of frames having a predefined duration;
identifying a portion of the auditory signal by applying pulse sequences of at least a portion of the series of frames segmented from the pulse train to a kernel adaptive autoregressive-moving-average (KAARMA) network; and
identifying a word by applying the series of frames segmented from the pulse train to a KAARMA chain including the KAARMA network.

7. The speech recognition method of claim 6, wherein the KAARMA chain comprises a plurality of KAARMA networks including the KAARMA network, and the word is identified based at least in part upon a plurality of states generated by the plurality of KAARMA networks of the KAARMA chain.

8. The speech recognition method of claim 1, wherein the portion of the series of frames is applied to the KAARMA network in a natural left-to-right temporal sequence.

9. The speech recognition method of claim 1, wherein the portion of the series of frames is applied to the KAARMA network in a reversed right-to-left temporal sequence.

10. A speech recognition method, comprising:
converting an auditory signal into a pulse train;
segmenting the pulse train into a series of frames having a predefined duration; and
identifying a portion of the auditory signal by applying pulse sequences of at least a portion of the series of frames segmented from the pulse train to a kernel adaptive autoregressive-moving-average (KAARMA) network, wherein the portion of the auditory signal is identified by applying the portion of the series of frames to the KAARMA network in a natural left-to-right temporal sequence and applying the portion of the series of frames to a second KAARMA network in a reversed right-to-left temporal sequence.

11. The speech recognition method of claim 10, wherein the portion of the auditory signal is identified based upon a first state generated by the KAARMA network and a second state generated by the second KAARMA network.

12. The speech recognition method of claim 1, wherein the auditory signal is converted into a plurality of pulse trains associated with corresponding frequency bands of the auditory signal, individual pulse trains of the plurality of pulse trains segmented into a corresponding series of frames having the predefined duration.

13. The speech recognition method of claim 12, wherein the portion of the auditory signal is identified by applying corresponding portions of the corresponding series of frames associated with the corresponding frequency bands to the KAARMA network.

14. A speech recognition system, comprising:
processing circuitry including a processor and memory comprising a speech recognition application, where execution of the speech recognition application by the processor causes the processing circuitry to:
convert an auditory signal into a pulse train;
segment the pulse train into a series of frames having a predefined duration, individual frames of the series of frames comprising a pulse sequence of the pulse train; and
identify a portion of the auditory signal by applying the pulse sequences of at least a portion of the series of frames segmented from the pulse train to a kernel adaptive autoregressive-moving-average (KAARMA) network.

15. The speech recognition system of claim 14, wherein the KAARMA network generates a state that identifies the portion of the auditory signal.

16. The speech recognition system of claim 14, wherein execution of the speech recognition application causes the processing circuitry to identify a word by applying the series of frames segmented from the pulse train to a KAARMA chain including the KAARMA network.

17. The speech recognition system of claim 16, wherein the KAARMA chain comprises a plurality of KAARMA networks including the KAARMA network, and the word is identified based at least in part upon a plurality of states generated by the plurality of KAARMA networks of the KAARMA chain.

18. The speech recognition system of claim 14, wherein the portion of the auditory signal is identified by applying the portion of the series of frames to the KAARMA network in a natural left-to-right temporal sequence and applying the portion of the series of frames to a second KAARMA network in a reversed right-to-left temporal sequence.

19. The speech recognition system of claim 18, wherein the portion of the auditory signal is identified based upon a first state generated by the KAARMA network and a second state generated by the second KAARMA network.

20. The speech recognition system of claim 14, wherein the auditory signal is converted into a plurality of pulse trains associated with corresponding frequency bands of the auditory signal, individual pulse trains of the plurality of pulse trains segmented into a corresponding series of frames having the predefined duration.

* * * * *